United States Patent
Satoh et al.

(10) Patent No.: US 9,391,710 B2
(45) Date of Patent: Jul. 12, 2016

(54) OPTICAL SIGNAL CONTROL DEVICE AND OPTICAL SIGNAL CONTROL METHOD

(75) Inventors: Mineto Satoh, Tokyo (JP); Tomoaki Kato, Tokyo (JP); Kenji Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 510 days.

(21) Appl. No.: 13/991,936

(22) PCT Filed: Dec. 6, 2011

(86) PCT No.: PCT/JP2011/006821
§ 371 (c)(1), (2), (4) Date: Jun. 6, 2013

(87) PCT Pub. No.: WO2012/077337
PCT Pub. Date: Jun. 14, 2012

(65) Prior Publication Data
US 2013/0272700 A1    Oct. 17, 2013

(30) Foreign Application Priority Data

Dec. 6, 2010   (JP) ................................. 2010-271757

(51) Int. Cl.
*H04B 10/00*    (2013.01)
*H04B 10/516*   (2013.01)
(Continued)

(52) U.S. Cl.
CPC .............. *H04B 10/516* (2013.01); *H04B 10/50* (2013.01)

(58) Field of Classification Search
CPC ............ H04B 10/505; H04B 10/5053; H04B 10/5057; H04B 10/50577; H04B 10/5059; H04B 10/50597
See application file for complete search history.

(56) References Cited

U.S. PATENT DOCUMENTS

| | | | |
|---|---|---|---|
| 4,618,210 A | 10/1986 | Kondo | |
| 2005/0036791 A1* | 2/2005 | Gunn, III | G02F 1/025 398/183 |
| 2007/0177882 A1* | 8/2007 | Akiyama | G02F 1/2255 398/185 |

(Continued)

FOREIGN PATENT DOCUMENTS

| | | |
|---|---|---|
| EP | 1596246 A1 | 11/2005 |
| EP | 2006723 A1 | 12/2008 |

(Continued)

OTHER PUBLICATIONS

International Search Report for PCT/JP2011/006821 dated Jan. 24, 2012.

(Continued)

*Primary Examiner* — Daniel Dobson
(74) *Attorney, Agent, or Firm* — Sughrue Mion, PLLC

(57) ABSTRACT

An optical signal control device includes an optical signal control unit and a drive circuit. The optical signal control unit includes m number of optical waveguides for propagating carrier light and (m×n) number of interaction regions, n number of interaction regions formed on each of the optical waveguides. The drive circuit includes (m×n) number of phase control units. The (m×n) number of phase control unit output a data signal for controlling the action of the (m×n) number of interaction regions to each of the (m×n) number of interaction regions. Each of the (m×n) number of phase control units outputs the data signal so that timing when the carrier light propagates to the interaction region to output the data signal and timing when the data signal arrives at the interaction region are synchronized. One of m and n is two or more.

18 Claims, 18 Drawing Sheets

(51) Int. Cl.
  *H04B 10/50* (2013.01)
  *H04J 14/00* (2006.01)

(56) References Cited

U.S. PATENT DOCUMENTS

| | | | | |
|---|---|---|---|---|
| 2009/0041473 A1* | 2/2009 | Nishihara | ......... | H04B 10/5051 398/188 |
| 2009/0274469 A1* | 11/2009 | Yuki | ......... | H04B 10/0799 398/152 |
| 2011/0044573 A1* | 2/2011 | Webster | ......... | G02F 1/0121 385/3 |
| 2011/0044702 A1* | 2/2011 | Mizuguchi | ......... | H04B 10/5053 398/184 |
| 2011/0091221 A1* | 4/2011 | De Gabory | ......... | H04B 10/505 398/188 |

FOREIGN PATENT DOCUMENTS

| | | |
|---|---|---|
| JP | 2-196212 A | 8/1990 |
| JP | 3-179939 A | 8/1991 |
| JP | 5-257102 A | 10/1993 |
| JP | 5-289033 A | 11/1993 |
| JP | 2003-270685 A | 9/2003 |
| JP | 2003-329989 A | 11/2003 |
| JP | 2007-158415 A | 6/2007 |
| JP | 2008-276145 A | 11/2008 |
| JP | 2009-94988 A | 4/2009 |
| JP | 2009-229806 A | 10/2009 |

OTHER PUBLICATIONS

Communication dated Oct. 6, 2014, issued by the European Patent Office in counterpart Application No. 11847838.7.

* cited by examiner

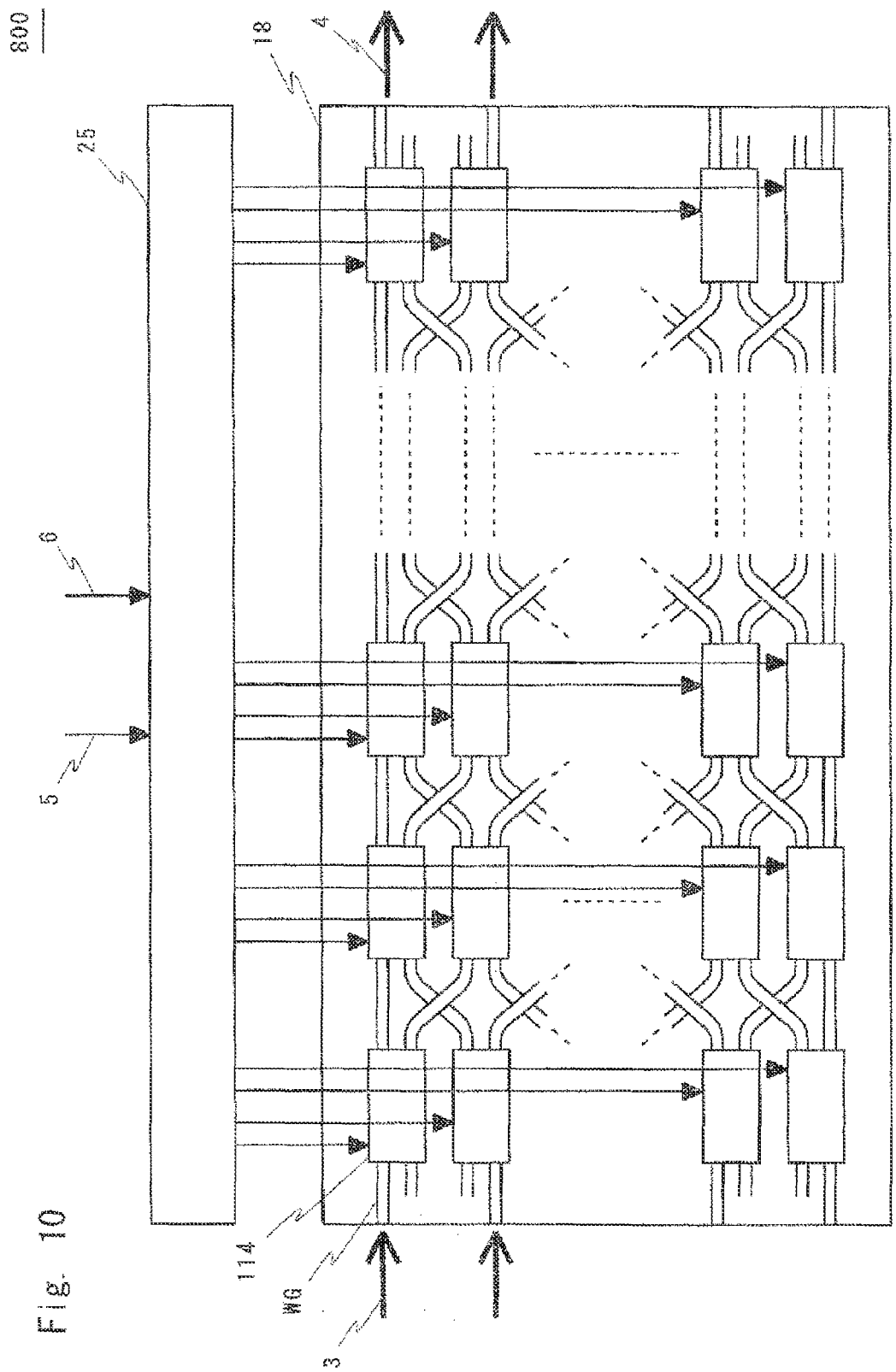

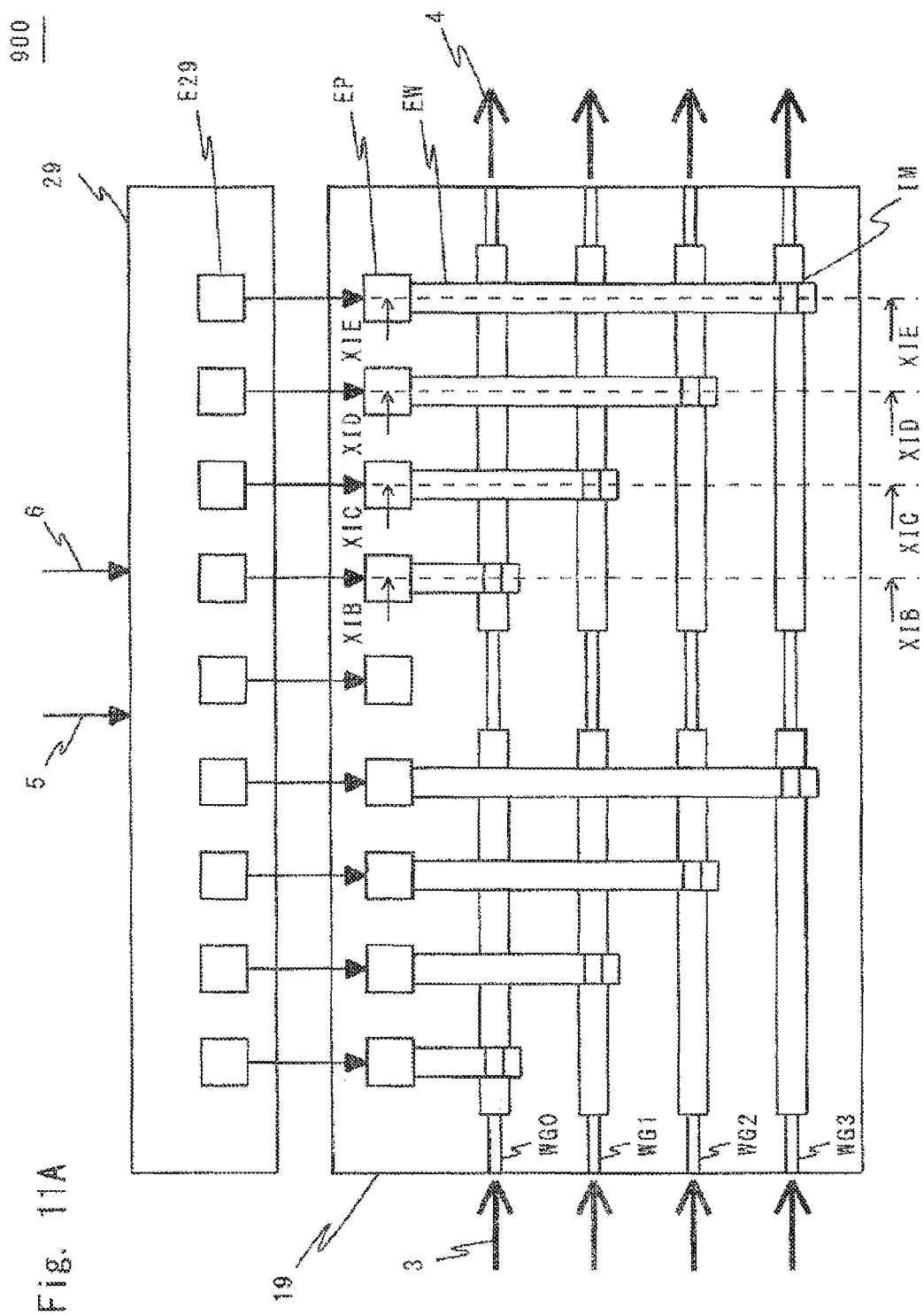

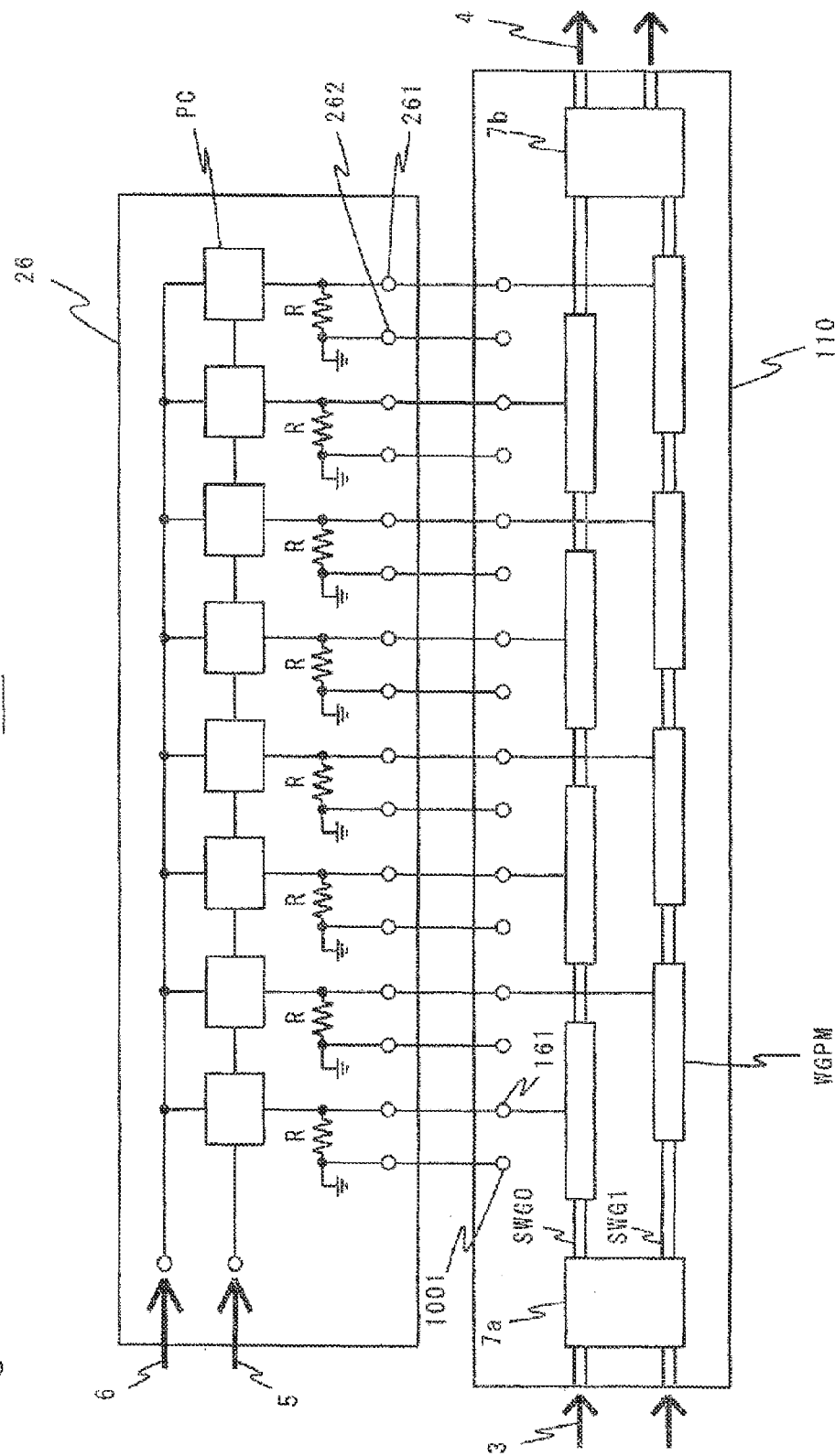

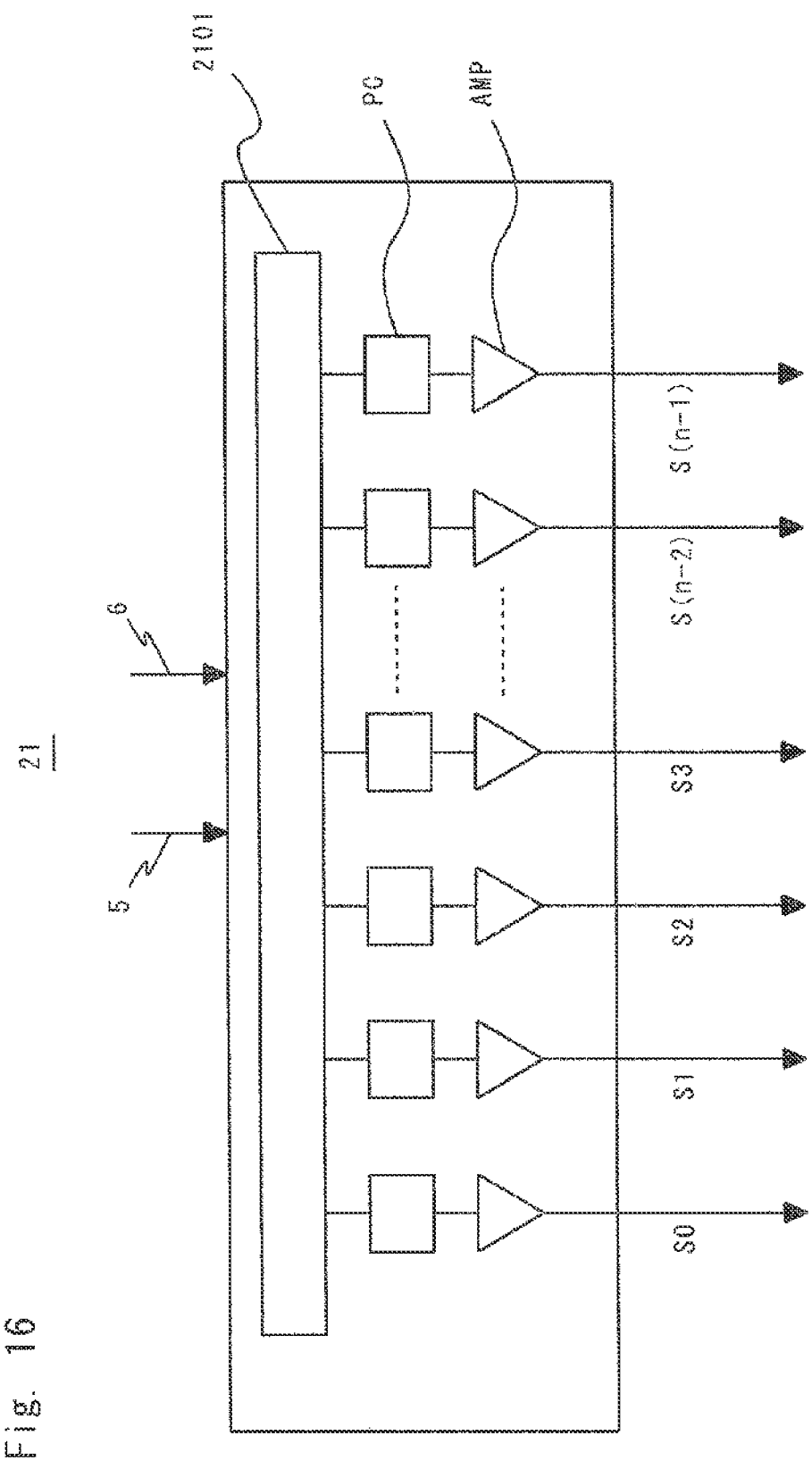

OPTICAL SIGNAL CONTROL DEVICE AND OPTICAL SIGNAL CONTROL METHOD

CROSS REFERENCE TO RELATED APPLICATIONS

This application is a National Stage of International Application No. PCT/JP2011/006821 filed Dec. 6, 2011, claiming priority based on Japanese Patent Application No. 2010-271757 filed Dec. 6, 2010, the contents of all of which are incorporated herein by reference in their entirety.

TECHNICAL FIELD

The present invention relates to an optical signal control device and an optical signal control method and, particularly, to an optical signal control device and an optical signal control method used for a communication system.

BACKGROUND ART

The demand for broadband multimedia communication services such as Internet and video delivery is explosively increasing. Accordingly, in trunk line system and metro system, introduction of a higher capacity and higher reliability dense wavelength-division multiplexing optical fiber communication system capable of longer distance transmission is in progress. Further, in subscriber system also, proliferation of optical fiber access services is rapidly growing. In such communication systems using an optical fiber, it is required to enhance the transmission bandwidth efficiency for each optical fiber. Further, in order to reduce the environmental burden, it is required that communication systems using an optical fiber have a structure to achieve a small size, lower power consumption and low cost.

In order to enhance the transmission bandwidth efficiency for each optical fiber, it is necessary to increase the data symbol frequency or increase the multilevel number.

In order to achieve operation with increased data symbol frequency, the bandwidth of elements is a critical factor. Taking optical elements (such as an optical modulator and a photoreceiver, for example) used generally in optical fiber communication systems as an example, the bandwidth is limited for CR time constant mainly controlled by the effect of the capacitance of elements. Because those optical elements use the interaction between light and electricity, the required voltage and element capacitance are determined by the electric field strength and the interaction length. In general, when the interaction length is long, the electric field strength per unit length can be weak, but the element capacitance increases. Therefore, in an optical modulator or an optical switch, for example, power consumption and extinction characteristics, and bandwidth are in the relationship of trade-off. Further, in a receiver, receiving sensitivity and bandwidth are in the relationship of trade-off. Thus, in those optical elements, it has been necessary to make eclectic design in consideration of such trade-off relationship.

To address the above issue, a technique to solve the trade-off between the interaction length and the bandwidth has been proposed. As an example, the traveling-wave electrode structure that avoids bandwidth degradation by making the propagation speed of light and electricity closer is proposed (Patent Literature 1). Further, the segmented-electrode structure that reduces the capacitance by electrically dividing a long electrode and driving them independently or the like is proposed (Patent Literatures 2 to 4).

Further, a method for increasing the multilevel number and reducing the environmental burden is proposed. As such a method, a structure that performs operation on an optical signal as it is to reduce the burden of electrical signal processing is proposed instead of a general method that generates a complicated electrical signal format and then converts it into an optical signal. As such a method, the optical modulator that can generate a quadrature amplitude modulation (QAM) signal by placing optical waveguides that control the phase or amplitude of light in parallel and multiplexing optical signals is proposed (Patent Literature 5). Further, the optical modulator that can generate a phase shift keying signal by dividing and placing regions to control the phase or amplitude of light along the propagation direction on one optical waveguide or the like is proposed (Patent Literature 6).

Further, the structure which connects a plurality of independent optical modulators in series or in parallel and in which phase modulation or intensity modulation is performed in each of the optical modulator is proposed (Patent Literature 7). According to this structure, it is possible to correct delay variations between different bits by superimposing modulated light along the phase axis or time axis.

CITATION LIST

Patent Literature

PTL1: Japanese Unexamined Patent Application Publication No. H02-196212
PTL2: Japanese Unexamined Patent Application Publication No. H05-257102
PTL3: Japanese Unexamined Patent Application Publication No. 2003-329989
PTL4: Japanese Unexamined Patent Application Publication No. H05-289033
PTL5: Japanese Unexamined Patent Application Publication No. 2009-94988
PTL6: Japanese Unexamined Patent Application Publication No. H03-179939
PTL7: Japanese Unexamined Patent Application Publication No. 2007-158415

SUMMARY OF INVENTION

Technical Problem

As described above, various techniques are proposed to achieve enhancement of the transmission bandwidth efficiency for each optical fiber and reduction of the environmental burden at the same time in optical communications. These techniques propose the structures including a complex traveling-wave electrode, electrodes divided along the light propagation direction or optical elements connected in parallel. These structures are far more complex than the structure currently in practical use.

In such a complex structure of optical elements, delay of electrical signal propagation depending on path and delay of light propagation cause significant effects on characteristics. In the case of the traveling-wave electrode, attenuation of a signal is especially a critical issue. Therefore, under present circumstances, measures can be taken only by reducing the length of the traveling-wave electrode or using a high power.

Further, in the structure that divides the electrode along the light propagation direction, delay of a signal is an issue, and it has been adjusted by an electrical wire length (Patent Literature 2). In this method, changes in characteristics within and between elements occur due to changes in electrical wire length occurring in the process of production. To correct changes in characteristics, individual adjustment and synchronization of elements are required. Further, because the electrode layout becomes complex as the structure becomes complex, there is an issue of complicated design and decrease in flexibility and expandability.

Further, in the above technique also, the structure that adjusts the delay time of an input electrical signal by a delay adjustment circuit is proposed (Patent Literatures 3, 4 and 6). However, the delay adjustment in such a structure is to perform time-division multiplexing (TDM) of signals by controlling time in the order of about 1 UI, which is several 100 ps, or to adjust either one of electrical wire delay or light propagation delay. Although the time-division multiplexing is effective for increasing the capacity of transmission, the effects such as improving the bandwidth or achieving a lower voltage for reduction of the environment burden cannot be obtained. Further, no specific feasible structure example is proposed for adjustment of electrical wire delay or light propagation delay. In a high bandwidth optical circuit, the size of each component is in the order of several hundreds μm or less in order to reduce the capacitance. The electrical wire delay or light propagation delay in this order is the order of several ps or less. In the above example, there is no description or specific example indicating that such accurate control is possible. Therefore, it is unclear whether accurate control required for a broadband optical circuit can be made or not.

Further, in the structure according to Patent Literature 7, it is only possible to correct delay variations between multiplexed different bits.

The present invention has been accomplished to solve the above problems and an object of the present invention is thus to provide a simple and highly expandable optical signal control device and an optical signal control method capable of externally programmable accurate control.

Solution to Problem

An optical signal control device according to one aspect of the present invention includes an optical signal control unit for outputting output light generated by changing an amplitude and a phase of input carrier light; and a drive circuit for supplying a data signal for controlling a change in the amplitude and the phase of the carrier light to the optical signal control unit, wherein the optical signal control unit includes m (m is an integer of one or more) number of optical waveguides arranged in parallel between light input and light output, for letting the carrier light propagate therethrough; and (m×n) number of interaction regions, n (n is an integer of one or more) number of interaction regions formed on each of the m number of optical waveguides, for changing the amplitude and the phase of the carrier light propagating through each of the m number of optical waveguides in accordance with the data signal, the drive circuit includes (m×n) number of phase control means for receiving the data signal from outside, controlling the phase of the received data signal and outputting the data signal to each of the (m×n) number of interaction regions, each of the (m×n) number of phase control means outputs the data signal so that timing when the carrier light propagating through the optical signal control means arrives at the interaction region to output the data signal and timing when the data signal arrives at the interaction region are synchronized, and one of m and n is two or more.

An optical signal control method according to one aspect of the present invention includes inputting carrier light to m (m is an integer of one or more) number of optical waveguides; receiving a data signal for controlling a change in an amplitude and a phase of the carrier light by (m×n) number of phase control means and controlling the phase of the received data signal; outputting the data signal with the controlled phase from the (m×n) number of phase control means to (m×n) number of interaction regions, n (n is an integer of one or more) number of interaction regions formed on each of the m number of optical waveguides, so that the data signal with the controlled phase arrives at the interaction region in synchronization with timing when the carrier light arrives at each of the (m×n) number of interaction regions; and outputting the carrier light with the amplitude and the phase changed by the (m×n) number of interaction regions as output light, wherein one of m and n is two or more.

Advantageous Effects of Invention

According to the present invention, it is possible to provide a simple and highly expandable optical signal control device and an optical signal control method capable of externally programmable accurate control.

BRIEF DESCRIPTION OF DRAWINGS

FIG. 10 is a block diagram showing a structure example of an optical matrix switch 800 according to an eighth embodiment;

FIG. 11A is a top view showing a wiring structure of an optical signal control device 900 according to a ninth embodiment;

FIG. 12 is a block diagram showing a structure example of an optical signal control device 1000 according to a tenth embodiment;

FIG. 16 is a block diagram showing a structure of a drive circuit 21.

DESCRIPTION OF EMBODIMENTS

Embodiments of the present invention will be described hereinbelow with reference to the drawings. Note that, in the figures, the identical reference symbols denote identical structural elements and the redundant explanation thereof is omitted as appropriate.

First Embodiment

Figure 1:
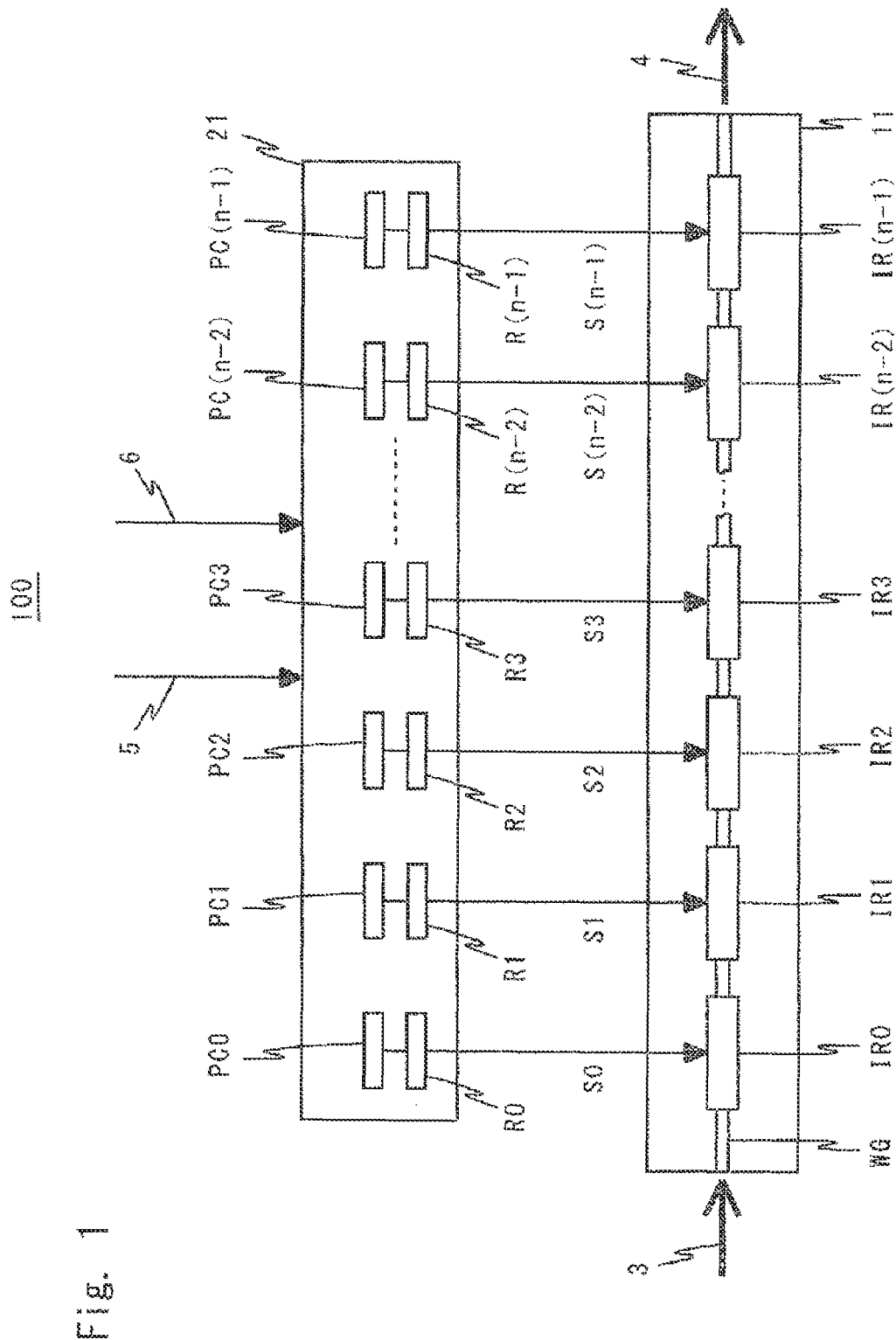
FIG. 1 is a block diagram showing a structure of an optical signal control device 100 according to a first embodiment.

A first embodiment of the present invention is described hereinafter with reference to a specific structure example. FIG. 1 is a block diagram showing a structure of an optical signal control device 100 according to the first embodiment. The optical signal control device 100 includes an optical signal control unit 11 and a drive circuit 21.

The optical signal control unit 11 includes one optical waveguide WG and n (n is an integer of two or more) number of interaction regions IR0 to IR(n−1). The interaction regions IR0 to IR(n−1) are arranged sequentially from the light input end on the optical waveguide WG. The interaction regions IR0 to IR(n−1) are electrically isolated from one another. Carrier light 3 is input to the optical signal control unit 11. The carrier light 3 is then introduced into the optical waveguide WG. The carrier light 3 introduced into the optical waveguide WG is modulated in its amplitude and phase by the interaction regions IR0 to IR(n−1). The modulated light signal is output as output light 4.

The drive circuit 21 includes n number of phase controllers PC0 to PC(n−1) and n number of terminators R0 to R(n−1). The phase controllers PC0 to PC(n−1) are connected to the ground through the terminators R0 to R(n−1). A data signal 5 and a clock signal 6 are supplied from outside to the phase controllers PC0 to PC(n−1). Then, the phase controllers PC0 to PC(n−1) output data signals S0 to S(n−1) to the corresponding interaction regions IR0 to IR(n−1). Note that the placement of the phase controllers PC0 to PC(n−1) and the terminators R0 to R(n−1) in the drive circuit 21 of FIG. 1 is just an example, and the placement is not limited thereto; however, the terminators R0 to R(n−1) are preferably placed near the interaction regions IR0 to IR(n−1) in terms of high frequency characteristics.

The operation of the optical signal control device 100 is described next. The drive circuit 21 gives a delay to the data signal 5 in accordance with the clock signal 6 as a reference. The drive circuit 21 thereby outputs data signals with at least the same number of timing differences as the number of interaction regions IR, which is at least n different timing differences, independently of one another. Specifically, the phase controllers PC0 to PC(n−1) output the data signals S0 to S(n−1) obtained by adding certain delay times to the data signal 5 in accordance with the clock signal 6.

For the phase controllers PC0 to PC(n−1), phase control accuracy in the order of ps is required. This phase control accuracy can be achieved by performing complementation using a circuit including a phase interpolation, retiming and output, for example.

The delay time given by the phase controllers PC0 to PC(n−1) is described. Hereinafter, the sum of the length of the interaction regions IR0 to IR(n−1) in the light propagation direction and the length of electrical isolation parts between the adjacent interaction regions IR0 to IR(n−1) is L. The light propagation speed through the optical waveguide WG is Vopt. The k-th (k is an integer satisfying 1≤k≤(n−1)) interaction region from the light input end of the optical signal control unit 11 is an interaction region IRk. The arrival of light in the k-th interaction region IRk delays by a light propagation delay amount Dk compared with the 0-th interaction region IR0. The light propagation delay amount Dk in this case is represented by the following expression (1):

$$Dk = kL/Vopt \quad (1)$$

The k-th phase controller PCk of the drive circuit 21 gives a delay obtained by subtracting the delay amount caused by the electrical path to each of the interaction regions IR0 to IR(n−1) from the light propagation delay amount Dk (=kL/Vopt) to the data signal 5. Then, the data signal Sk to which the light propagation delay amount Dk has been added is output to the k-th interaction region IRk. Thus, the phase controllers PC0 to PC(n−1) give the data signal to the interaction regions IR0 to IR(n−1) in a cascade manner according to the propagation of light. The timing of optical signal control in the interaction regions IR0 to IR(n−1) can be thereby synchronized with the propagation of light.

This embodiment is based on the technical idea that the data signal whose phase is adjusted in synchronization with the propagation of light is applied in a cascade within the same bit, not between different bits. To implement the technical idea according to this embodiment, the structure using the optical signal control unit having the plurality of interaction regions and the drive circuit having the phase controllers in the ps order is not described or suggested in any of Patent Literatures described above. Accordingly, it is difficult for those skilled in the art to come up with the optical signal control device according to this embodiment based on the description of those Patent Literatures.

On the other hand, by intentionally shifting the timing of optical signal control in the interaction regions IR0 to IR(n−1) with respect to the propagation of light, it is possible to make waveform compensation such as digital pre-distortion.

Second Embodiment

Figure 2:
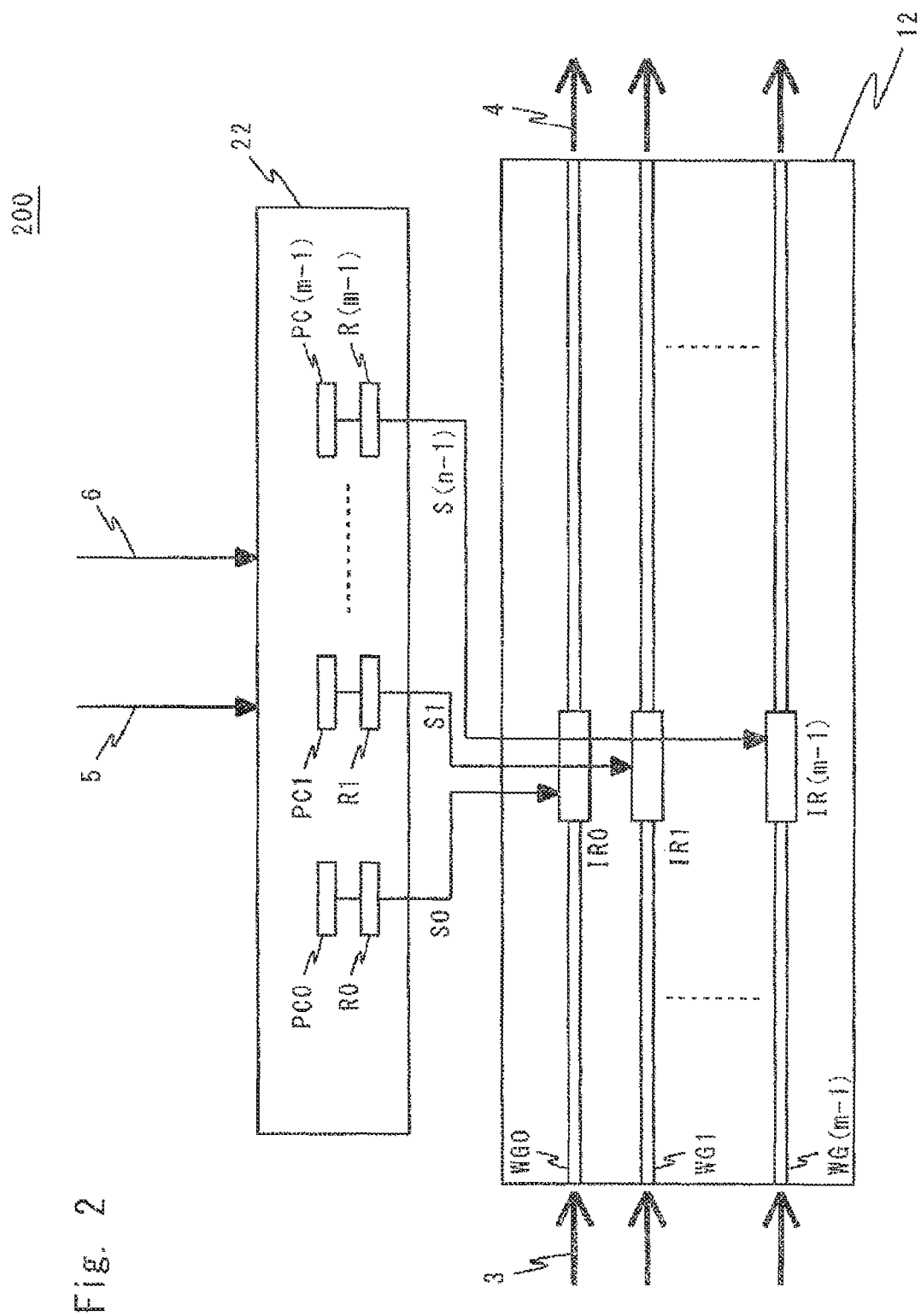
FIG. 2 is a block diagram showing a structure of an optical signal control device 200 according to a second embodiment.

Next, a second embodiment of the present invention is described hereinafter with reference to a specific structure example. FIG. 2 is a block diagram showing a structure of an optical signal control device 200 according to the second embodiment. The optical signal control device 200 includes an optical signal control unit 12 and a drive circuit 22.

The optical signal control unit 12 includes m (m is an integer or two or more) number of optical waveguides WG0 to WG(m−1). On the optical waveguides WG0 to WG(m−1), interaction regions IR0 to IR(m−1) are placed, respectively. Carrier light 3 is input to the optical signal control unit 12. The carrier light 3 is then introduced into the optical waveguides WG0 to WG(m−1). The carrier light 3 introduced into the optical waveguides WG0 to WG(m−1) is modulated in its amplitude and phase by the interaction regions IR0 to IR(m−1). The modulated light signal is output as output light 4.

The drive circuit 22 includes m number of phase controllers PC0 to PC(m−1) and m number of terminators R0 to R(m−1). The phase controllers PC0 to PC(m−1) are connected to the terminators R0 to R(m−1), respectively. A data signal 5 and a clock signal 6 are supplied from outside to the phase controllers PC0 to PC(m−1). Then, the phase controllers PC0 to PC(m−1) output data signals S0 to S(m−1) to the corresponding interaction regions IR0 to IR(m−1).

The operation of the optical signal control device 200 is described next. The drive circuit 22 gives a delay to the data signal 5 in accordance with the clock signal 6 as a reference. The drive circuit 22 thereby outputs data signals with at least the same number of timing differences as the number of interaction regions IR, which is at least m different timing differences, independently of one another. Specifically, the phase controllers PC0 to PC(m−1) output the data signals S0 to S(m−1) obtained by adding a certain delay time to the data signal 5 in accordance with the clock signal 6. For the phase controllers PC0 to PC(m−1), phase control accuracy in the order of ps is required. This phase control accuracy can be achieved by the same way as in the first embodiment.

The delay time given by the phase controllers PC0 to PC(m−1) is described. The distances from the drive circuit 22 to the respective optical waveguides to WG(m−1) are different from one another. Thus, the timing when a signal arrives at the optical waveguides to WG(m−1) from the drive circuit 22 is later as it is farther from the drive circuit 22. It is assumed that the optical waveguides to WG(m−1) are arranged at regular intervals W. It is also assumed that the propagation speed of an electrical signal output from the drive circuit 22 to the optical signal control unit 12 is Vsig. In this case, a data signal Sp that arrives at the p-th (p is an integer satisfying 1≤p≤m) interaction region IRp delays by the electrical propagation delay amount ΔD behind a data signal that arrives at the 0th interaction region IR0. The electrical propagation delay amount ΔD is represented by the following expression (2):

$$\Delta D = W \times p / Vsig \quad (2)$$

Thus, in order to synchronize the timing of optical signal control in the interaction regions IR0 to IR(m−1) with the propagation of light, data signals S0 to S(m−1) are supplied from the drive circuit 22 to the interaction regions IR0 to IR(m−1). In this case, the electrical propagation delay amount Dq added to a data signal Sq (q is an integer satisfying 0≤q≤m−1) is represented by the following expression (3):

$$Dq = W \times (m-1-q) / Vsig \quad (3)$$

Specifically, a data signal S0 is output at the latest timing from the drive circuit 22. The electrical propagation delay amount of the data signal S0 in this case is (m−1)W/Vsig. On the other hand, a data signal S(m−1) is output at the earliest timing. The electrical propagation delay amount of the data signal S(m−1) in this case is 0. It is thereby possible to synchronize the timing of optical signal control in the interaction regions IR0 to IR(m−1) with the propagation of light.

Third Embodiment

Figure 3:
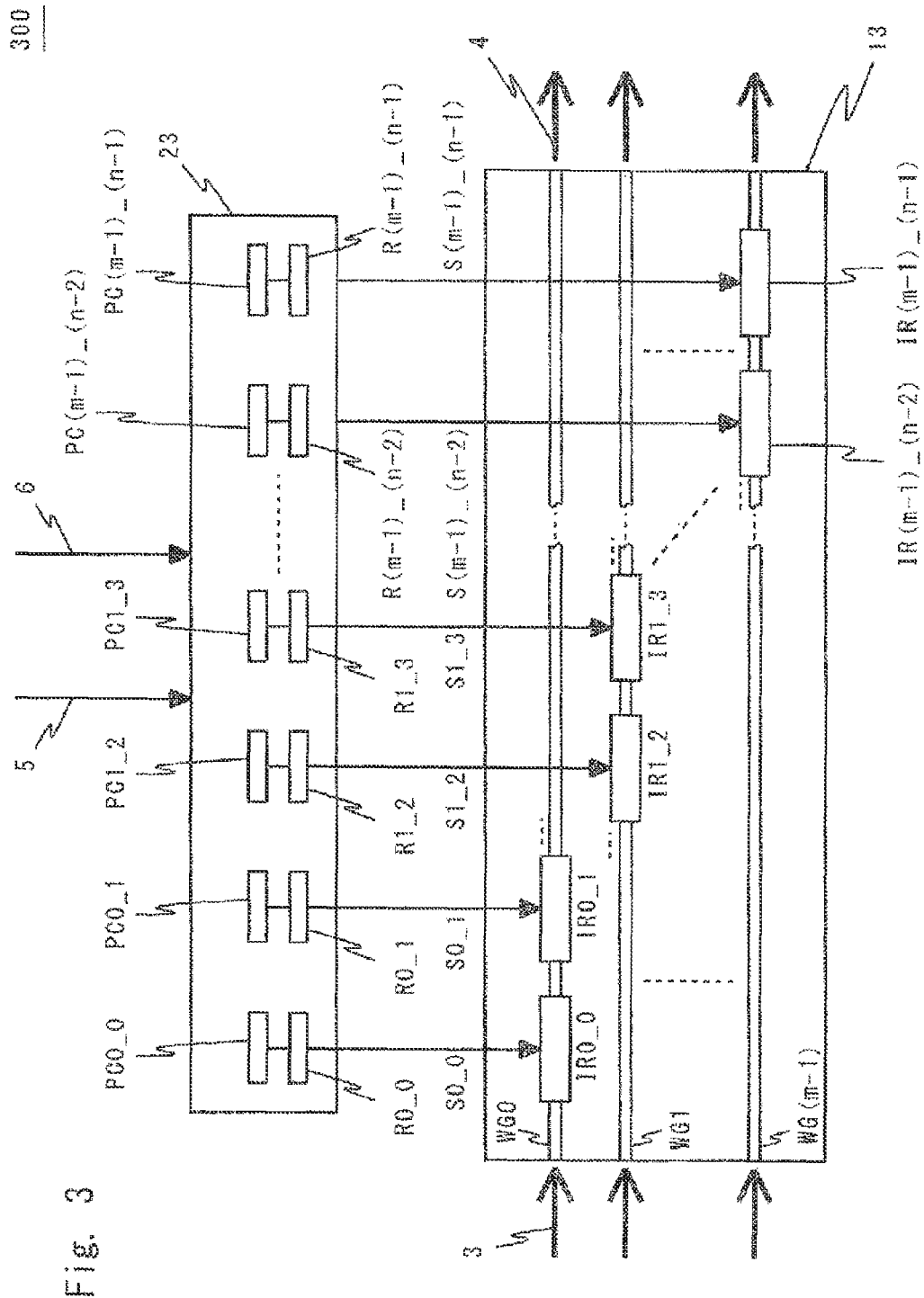
FIG. 3 is a block diagram showing a structure of an optical signal control device 300 according to a third embodiment.

Next, a third embodiment of the present invention is described hereinafter with reference to a specific structure example. FIG. 3 is a block diagram showing a structure of an optical signal control device 300 according to the third embodiment. The optical signal control device 300 has a structure combining the optical signal control device 100 according to the first embodiment and the optical signal control device 200 according to the second embodiment. The optical signal control device 300 includes an optical signal control unit 13 and a drive circuit 23.

The optical signal control unit 13 includes m (m is an integer or two or more) number of optical waveguides to WG(m−1). The optical waveguides to WG(m−1) are arranged in parallel. On the optical waveguides to WG(m−1), n (n is an integer of one or more) interaction regions IR are placed, respectively. Thus, the optical signal control unit 13 has (m×n) number of interaction regions IR. The (m×n) number of interaction regions IR are electrically isolated from one another. Note that, in FIG. 3, only two interaction regions IR are shown for each optical waveguide for the sake of simplification. In practice, in the optical signal control unit 13, the (m×n) number of interaction regions IR are arranged in a matrix. Hereinafter, the j-th (j is an integer of 0≤j≤n−1) interaction region IR from the light input end which is placed on the optical waveguide WGi (i is an integer of 0≤i≤m−1) is referred to as an interaction region IRi_j.

Further, at least two electrodes (not shown) for applying a potential difference or applying a current are formed on the (m×n) number of interaction regions IR. In one of those electrodes, the (m×n) number needs to be electrically isolated and independent of one another, but the other electrode may be a common electrode. Further, those electrodes are formed as lumped electrodes.

Note that, in the optical signal control unit 13, in no cases both of n and m are one. Accordingly, at least one of n and m is an integer of two or more.

The carrier light 3 is input to the optical signal control unit 13. The carrier light 3 is then introduced into the optical waveguides WG0 to WG(m−1). The carrier light 3 introduced into the optical waveguides WG0 to WG(m−1) is modulated in its amplitude and phase by the interaction regions IR. The modulated light signal is output as output light 4.

The drive circuit 23 includes (m×n) number of phase controllers PC and (m×n) number of terminators R. A phase controller PC that is connected to the interaction region IRi_j is a phase controller PCi_j. A terminator R that is connected to the phase controller PCi_j is a terminator Ri_j. The phase controller PCi_j outputs a data signal Si_j to the interaction region IRi_j. A data signal 5 and a clock signal 6 are supplied from outside to the phase controller PCi_j.

The operation of the optical signal control device 300 is described next. The phase controller PCi_j gives a certain delay time to the data signal 5 in accordance with the clock signal 6. The drive circuit 23 preferably outputs delayed data signals with the same number of timing differences as the number of interaction regions IR, which is at least (m×n) different timing differences, independently of one another. Specifically, the phase controller PCi_j outputs the data signal Si_j obtained by adding a certain delay time to the data signal 5 in accordance with the clock signal 6. For the phase controller PCi_j, phase control accuracy in the order of ps is required. This phase control accuracy can be achieved by the same way as in the first embodiment. Further, when the number of independent data signals is larger than the number (m×n) of interaction regions IR, different data signals may be multiplexed or a sub-signal for pre-emphasizing a waveform may be input in one interaction region IR, for example.

Thus, in order to synchronize the timing of action in the (m×n) number of interaction regions with the propagation of light, the drive circuit 23 outputs the delayed data signals with (m×n) different delay times to the (m×n) number of interaction regions IR. The electrical propagation delay amount D of the data signal Si_j supplied to the interaction region IRi_j is represented by the following expression (4) from the expressions (1) and (3):

$$D = Di + Dj = jL/Vopt + (m-1-i)W/Vsig \quad (4)$$

Specifically, as the value of i increases, the electrical propagation delay amount of the data signal Si_j decreases. On the other hand, as the value of j decreases, the electrical propagation delay amount of the data signal Si_j increases. An appropriate delay value corresponding to the position of the interaction region IRi_j is thereby given to the data signal Si_j. Thus, in the optical signal control device 300, it is possible to synchronize the timing of optical signal control in each of the interaction regions with the propagation of light.

Figure 4:
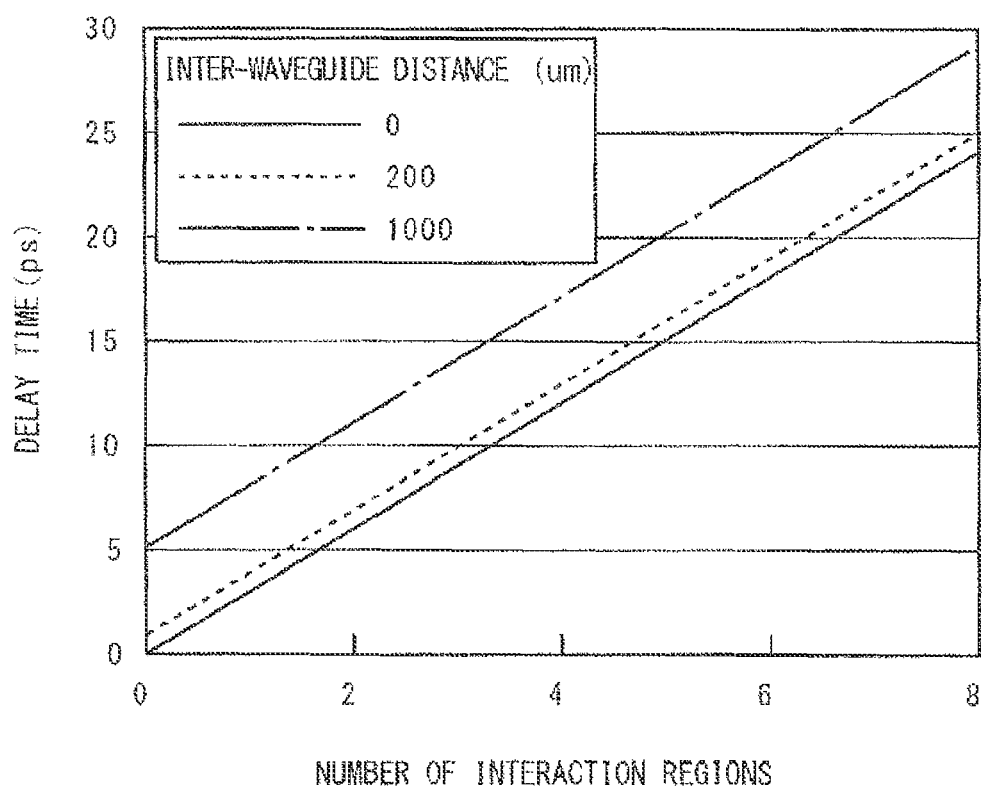
FIG. 4 is a graph showing an example of delay time of a data signal in the optical signal control device 300 according to the third embodiment.

FIG. 4 is a graph showing an example of delay time of a data signal in the optical signal control device 300. In this example, the optical waveguides WG0 to WG(m−1) are formed using InP. Further, the sum of the length of the respective interaction regions IR and the length of electrical isolation parts between the adjacent interaction regions IR is 300 μm. FIG. 4 shows a delay of signal arrival in the case where signals are output from the drive circuit 23 to each of the interaction regions IR at the same time. Note that, in FIG. 4, the 0-th optical waveguide that is connected at the shortest distance to the drive circuit 23 serving as a reference has an inter-waveguide distance 0 μm, and the delay times in the cases where the inter-waveguide distance is 0 μm, 200 μm and 1000 μm are shown. The horizontal axis indicates the sequence of the interaction regions IR.

As shown in FIG. 4, as getting away from the drive circuit 23, the arrival of a delayed data signal is delayed due to an electrical wire, and the delay of several ps occurs. Further, as the interaction region IR is away from the light input end of the optical signal control unit 13, the delay time increases.

Accordingly, for the (m×n) number of interaction regions IR arranged in a matrix, it is preferred to control (m×n) different delay times in total. According to the optical signal control device 300, control of (m×n) different delay times can be sufficiently made by using the drive circuit 23 having (m×n) number of phase controllers PC. It is thereby possible to make optical signal control in synchronization with the propagation of light in each of the interaction regions IR. Note that, however, in the arrangement where the inter-waveguide distance is as short as 20 μm, for example, the electrical propagation delay amount due to a difference in wire length is 0.1 ps order, which is sufficiently small, and therefore degradation of characteristics does not occur even if signals are output with the same delay time. Thus, the parameter of the delay time may be less than (m×n) depending on the arrangement of waveguides and characteristics required.

Thus, according to this structure, a control parameter that enables external compensation of the delay time with the propagation of electricity and light can be used. In other words, it is possible to make accurate control in an externally programmable manner using data signals. Thus, according to this structure, it is possible to eliminate the effects of changes in the process of producing element with a simple structure.

This embodiment is based on the technical idea that the data signal whose phase is adjusted to correct not only the delay due to the propagation of light but also the delay due to the propagation of electrical signals is applied in a cascade within the same bit, not between different bits. To implement the technical idea according to this embodiment, the structure using the optical signal control unit having the plurality of interaction regions and the drive circuit having the phase controllers in the ps order is not described or suggested in any of Patent Literatures described above. Accordingly, it is difficult for those skilled in the art to come up with the optical signal control device according to this embodiment based on the description of those Patent Literatures.

Figure 5:
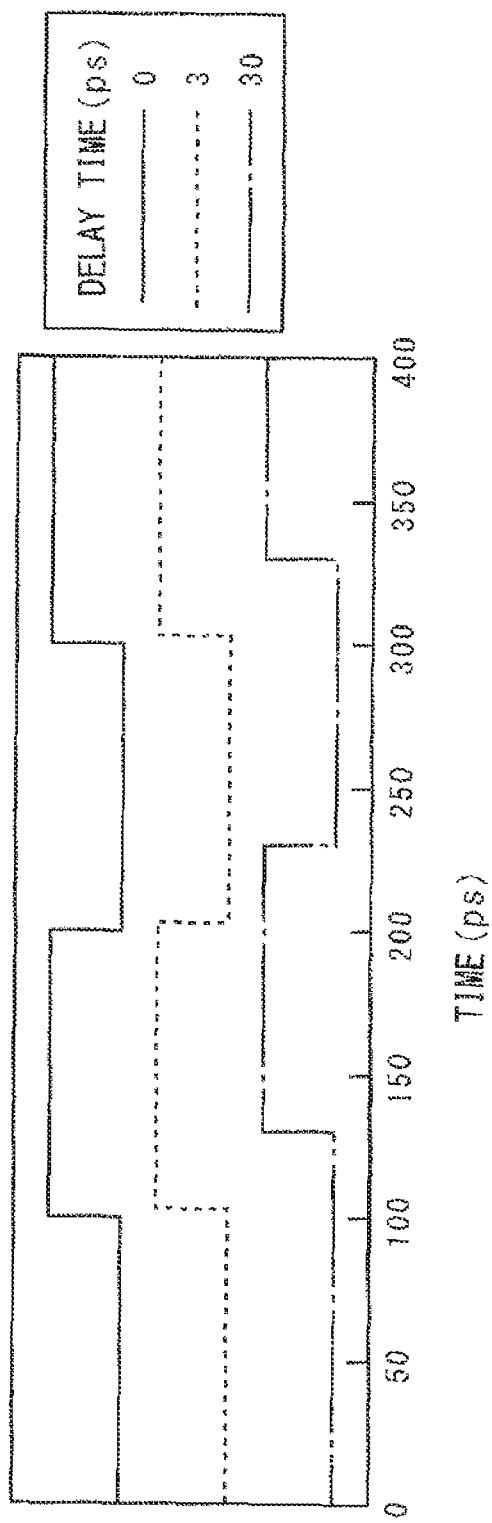
FIG. 5 is a graph showing an example of an output waveform in the optical signal control device 300 according to the third embodiment.

The output waveform of the electrical signal in this example is described hereinbelow. FIG. 5 is a graph showing an example of the output waveform in the optical signal control device 300. FIG. 5 shows the case where the bit rate is 10 Gb/s. As shown in FIG. 5, the delay time of several ps to several tens ps is added for 1UI=100 ps. The adjustment of the delay time in the order of several ps can be made by a drive IC including a phase interpolator described in the first embodiment, which has been actually produced experimentally using a CMOS process.

Further, in this structure, it is possible to correct not only delay variations between multiplexed different bits but also delay variations of the same bit, which is a single modulated signal (digital binary value: 01).

Although the (m×n) number of interaction regions IR are arranged in a matrix in this embodiment, the number arranged in each row and column may be any integers i and j satisfying 1<i<m and 1<j<n, respectively. Further, as for their arrangement, whether the i-th and (i+1)th regions and the j-th and (j+1)th regions are respectively adjacent or separated is not particularly limited.

Fourth Embodiment

Figure 6A:
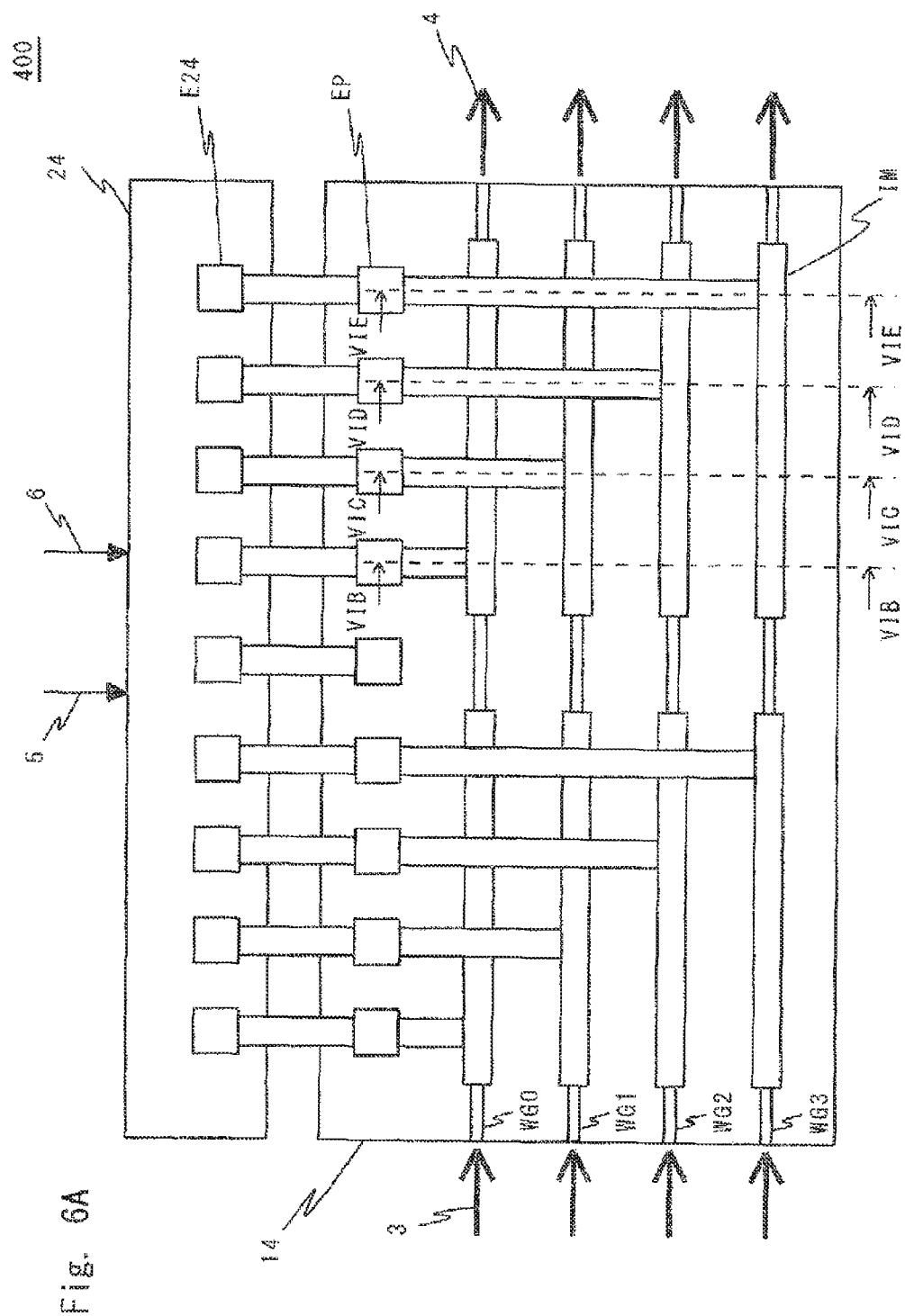
FIG. 6A is a top view showing a wiring structure of an optical signal control device 400 according to a fourth embodiment.
Figure 6B:
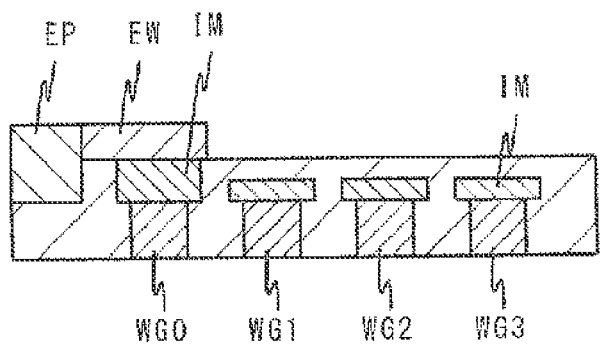
FIG. 6B is a cross-sectional view showing a wiring structure along line VIB-VIB in FIG. 6A.
Figure 6C:
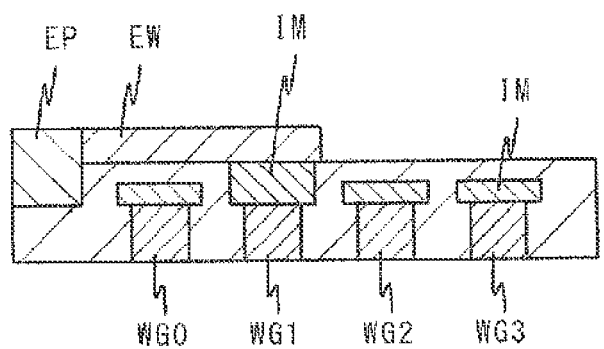
FIG. 6C is a cross-sectional view showing a wiring structure along line VIC-VIC in FIG. 6A.
Figure 6D:
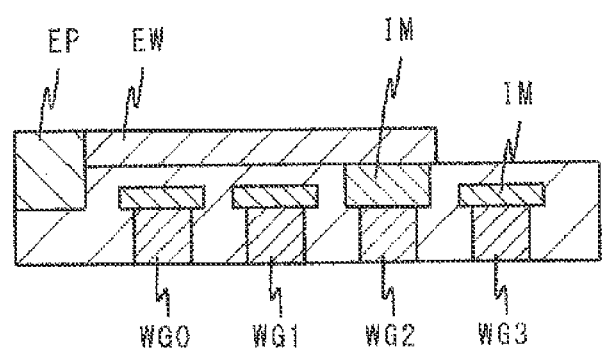
FIG. 6D is a cross-sectional view showing a wiring structure along line VID-VID in FIG. 6A.
Figure 6E:
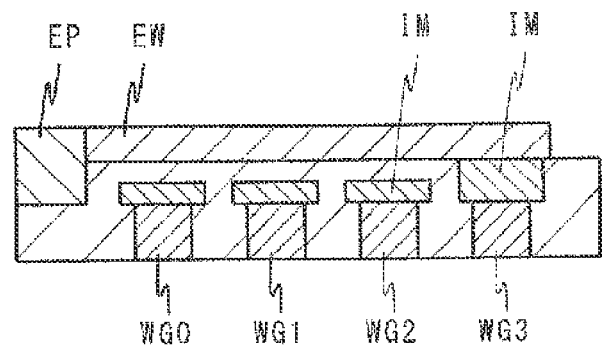
FIG. 6E is a cross-sectional view showing a wiring structure along line VIE-VIE in FIG. 6A.

A fourth embodiment of the present invention is described hereinafter with reference to a specific structure example. FIG. 6A is a top view showing a wiring structure of an optical signal control device 400 according to the fourth embodiment. The optical signal control device 400 is a specific example of the optical signal control device 300 according to the third embodiment.

In the third embodiment, a manufacturing method of the optical signal control device 300 is not particularly limited. Therefore, in the structure including a plurality of optical waveguides WG0 to WG(m−1) arranged in parallel like the optical signal control device 300, a wire connecting the interaction region IR and the drive circuit 23 runs across the other optical waveguides. In this case, interaction electrodes IM placed on the interaction regions IR are short-circuited. To avoid this, the interaction regions IR or the interaction electrodes IM on the interaction regions IR are generally formed to be short. Alternatively, the interaction regions IR or the interaction electrodes IM on the interaction regions IR are arranged in an offset manner. Measures are thereby taken to avoid contact between the interaction electrodes IM on different interaction regions IR. However, in these techniques, a part that cannot be used as the interaction region IR increases as the number of parallels of optical waveguides increases. As a result, the interaction efficiency between light and electricity is degraded.

The optical signal control device 400 according to this embodiment has a structure for preventing the degradation of the interaction efficiency without shortening the interaction regions. The optical signal control device 400 is described hereinbelow. As shown in FIG. 6A, the optical signal control device 400 has the structure in which the number of parallels of optical waveguides is 4 (i.e. m=4) and the number of interaction regions for each optical waveguide is 2 (i.e. n=2) in the optical signal control device 300. An optical signal control unit 14 corresponds to the optical signal control unit 13 of the optical signal control device 300. A drive circuit 24 corresponds to the drive circuit 23 of the optical signal control device 300. An interaction electrode IM is an electrode that is formed on the interaction region IR of the optical signal control device 300.

In the optical signal control unit 14, an electrical wire connecting the interaction electrode IM and an electrode pad EP runs across the other interaction electrodes IM. Therefore, measures to avoid short-circuit between electrodes on the interaction electrodes IM are taken. Further, an electrode E24 of the drive circuit 24 and the electrode pad EP are connected by an electrical wire. Note that the connection point between the interaction electrode IM and the above-described electrical wire is not particularly limited. Thus, the above-described electrical wire may be connected to any position of the interaction electrode IM as long as the interaction electrode IM can function as a lumped electrode. Further, although the interaction electrodes IM and the electrode pad EP are connected by a linear electrical wire in FIG. 6A, it is just an example, and the shape and path of the electrical wire are not limited thereto. Thus, an electrical wire with a path different from a linear electrical wire may be used as long as the electrical propagation delay amount corresponding to the path length is adjustable. Further, the drive circuit 24 is the same as that of the first to third embodiments and not described in detail, and only the electrode E24 is shown.

FIGS. 6B to 6E are cross-sectional views showing the wiring structure along line VIB-VIB, VIC-VIC, VID-VID and VIE-VIE in FIG. 6A. The optical signal control device 400 has a feature that the interaction electrode IM and an electrical wire EW of a lead part are formed in different layers (multilayer wiring). The electrode pad EP is electrically connected to only the corresponding interaction electrode IM through the electrical wire EW of the lead part.

An example of a manufacturing method of the above-described multilayer wiring is described. First, optical waveguides WG including interaction regions are formed on a semiconductor substrate, for example. After that, the interaction electrodes IM are formed in the upper layer of the optical waveguides WG. Next, insulating resin such as photosensitive PBO (polybenzoxazole), for example, is applied thereto. Then, only the photosensitive PBO on the interaction electrodes IM connected to the electrode pads EP are removed by exposure. After that, the electrical wires EW are formed, thereby producing the cross-sectional structure shown in FIG. 6B. Note that, however, this manufacturing method is just by way of illustration and does not limit the manufacturing method of the multilayer wiring.

According to this structure, it is possible to increase the number of parallels of optical waveguides without decreasing the length of interaction regions, in addition to achieving the same advantages as in the first embodiment. Further, because a simple and general-purpose structure can be implemented, each of the interaction regions can be arranged with the same length with a certain electrical isolation region interposed therebetween, for example. The optical phase modulator region, however, may have a different length.

Fifth Embodiment

Figure 7:
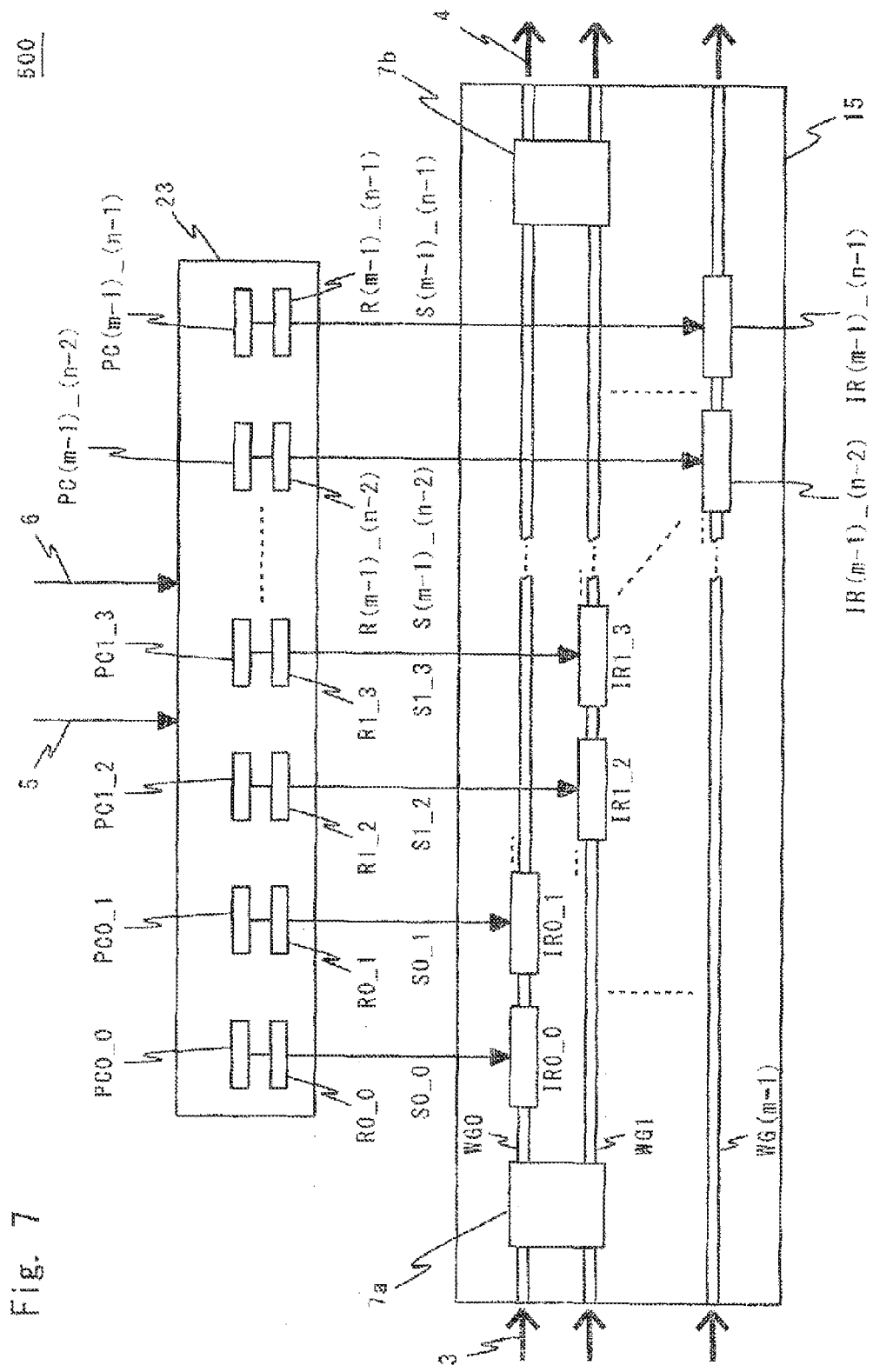
FIG. 7 is a block diagram showing a structure example of an optical signal control device 500 according to a fifth embodiment.

An optical signal control device 500 according to a fifth embodiment of the present invention is described hereinafter with reference to a specific structure example. FIG. 7 is a block diagram showing a structure example of the optical signal control device 500 according to the fifth embodiment. The optical signal control device 500 has the structure in which the optical signal control unit 13 of the optical signal control device 300 according to the third embodiment is replaced with an optical signal control unit 15. The optical signal control unit 15 has the structure in which an optical splitter/combiner 7a and an optical splitter/combiner 7b are added at the light input end and the light output end of the optical signal control unit 13, respectively. At least one set of Mach-Zehnder interferometers is thereby constructed in the optical signal control unit 15. The other structure of the optical signal control device 500 is the same as that of the optical signal control device 300 and not redundantly described.

The operation of the optical signal control device 500 is described hereinafter. Carrier light 3 that is input to the light input end is split into at least two through the optical splitter/combiner 7a. After that, as shown in FIG. 7, for example, the carrier light 3 propagates through the optical waveguides WG0 and WG1 independent of each other. At this time, each of the split carrier light 3 passes through the interaction region IR and thereby changes in its amplitude and phase. The light whose amplitude and phase have been changed then enters the optical splitter/combiner 7b from the optical waveguides WG0 and WG1 independent of each other, and light waves are superimposed by interference. After that, the superimposed light is output as the output light 4.

The optical signal control device 500 has a structure of a general Mach-Zehnder interferometer when using 1 input 2 output or 2 input 2 output splitters/combiners 7a and 7b, for example. However, the configuration, placement and number of optical splitters/combiners are not limited to this structure. For example, any r input (r is an integer) s output (s is an integer) splitter/combiner may be used. Further, a plurality of optical splitters/combiners may be placed in parallel or in series.

Thus, according to this structure, it is possible to change the phase of light and make interference. It is thereby possible to provide the optical signal control device or the optical switch capable of arbitrarily changing the phase and amplitude of light, as in the first embodiment.

Sixth Embodiment

Figure 8:
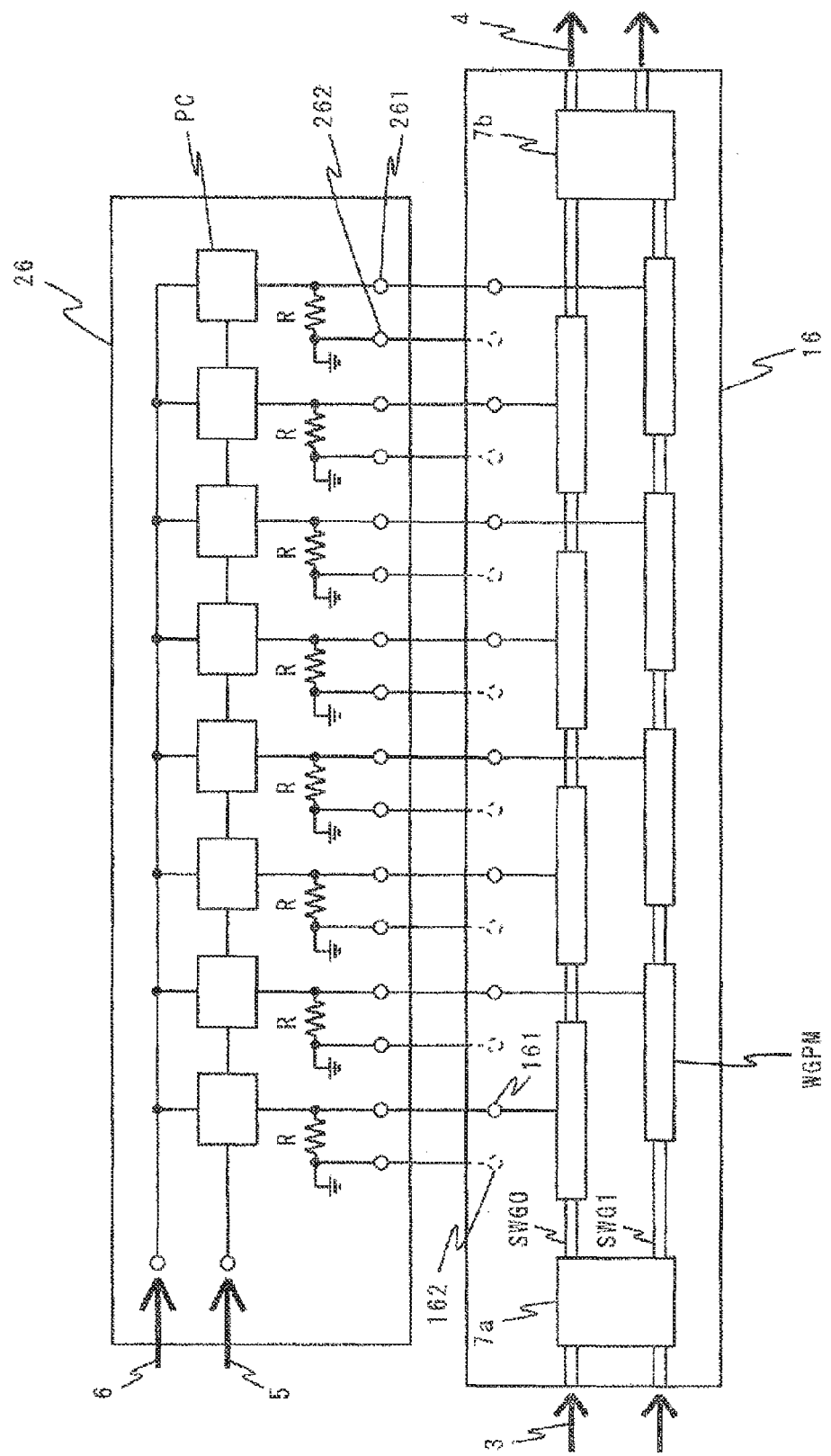
FIG. 8 is a block diagram showing a structure example of an optical signal control device 600 according to a sixth embodiment.

An optical signal control device 600 according to a sixth embodiment of the present invention is described hereinafter with reference to a specific structure example. FIG. 8 is a block diagram showing a structure example of the optical signal control device 600 according to the sixth embodiment. The optical signal control device 600 is a specific example of the optical signal control device 500 according to the fifth embodiment. The optical signal control device 600 has the structure in which the number of optical waveguides of the optical signal control device 500 is limited to two. The optical signal control device 600 includes a MZ modulator 16 and an IC drive circuit 26. The MZ modulator 16 corresponds to the optical signal control unit 15 of the optical signal control device 500. The IC drive circuit 26 corresponds to the drive circuit 23 of the optical signal control device 500.

The MZ modulator 16 is a MZ modulator with segmented electrodes. The MZ modulator 16 includes two semiconductor optical waveguides SWG0 and SWG1 and the optical splitters/combiners 7a and 7b. The semiconductor optical waveguides SWG0 and SWG1 are single-mode semiconductor optical waveguides. The optical splitters/combiners 7a and 7b are 2 input 2 output optical splitters/combiners. On each of the semiconductor optical waveguides SWG0 and SWG1, the n number of waveguide phase modulation regions WGPM are formed. The waveguide phase modulation regions WGPM correspond to the interaction regions IR of the optical signal control device 500. The MZ modulator 16 has a MZ interferometer structure in which the semiconductor optical waveguides SWG0 and SWG1 is a pair of delay paths. The carrier light 3 is input to the light input end of the MZ modulator 16, and the output light 4 is output from the light output end of the MZ modulator 16.

The semiconductor optical waveguides SWG0 and SWG1 have the structure that traps and guides the light. For this structure, a core layer and clad layers placed above and below the core layer may be used, which is a typical structure to trap and guide the light.

The waveguide phase modulation regions WGPM formed using semiconductors can change the refractive index of the carrier light propagating through the core layer (not shown) by applying an electrical field or injecting a current to the core layer. It is thereby possible to change the amplitude and phase of signal light (carrier light).

Further, both ends of the semiconductor optical waveguides SWG0 and SWG1 are formed by cleavage. Further, near the cleavage ends, a horizontal tapered spot size converter (not shown) is placed. Further, on the both cleavage ends, a low reflection film for a desired wavelength (not shown) is formed. Thus, input and output of light with a sufficiently low coupling loss can be attained.

The n (n is an integer of n≥2) number of waveguide phase modulation regions WGPM are arranged to define small sections of the semiconductor optical waveguides SWG0 and SWG1. Although the case of n=4 is shown in FIG. 8, the number is just an example and not limited to n=4.

The waveguide phase modulation regions WGPM that are adjacent to each other on one semiconductor optical waveguide are electrically isolated from each other. For example, the adjacent waveguide phase modulation regions WGPM can be electrically isolated by etching a conductive layer of the waveguide and forming a physical groove or making ion implantation of an element for preventing conductivity, such as hydrogen, helium or titanium, into the semiconductor.

Further, the MZ modulator 16 has terminals 161 and 162. The terminals 161 and 162 are used for connection between the MZ modulator 16 and the IC drive circuit 26. The terminal 161 is electrically connected to an electrode formed above the core layer (not shown) of the waveguide phase modulation region WGPM. The terminal 162 is electrically connected to an electrode formed below the core layer (not shown) of the waveguide phase modulation region WGPM. The electrical wire that connects the terminal 161 and the electrode formed above the waveguide phase modulation region WGPM is preferably placed without passing over another waveguide phase modulation region WGPM. Particularly, the electrical wire connected to the electrode formed above the waveguide phase modulation region WGPM on the semiconductor optical waveguide SWG1 preferably passes over the an electrically isolated region between the adjacent waveguide phase modulation regions WGPM on the semiconductor optical waveguide SWG0 in terms of high frequency characteristics. However, it is not limited thereto if the multilayer wiring described in the fourth embodiment is used. Further, the connection point between the electrode formed on the waveguide phase modulation region WGPM and the above-described electrical wire is not particularly limited. Thus, the above-described electrical wire may be connected to any position of the electrode formed on the waveguide phase modulation region WGPM as long as the electrode formed on the waveguide phase modulation region WGPM can function as a lumped electrode.

The IC drive circuit 26 is configured as a CMOS-IC (Complementary Metal Oxide Semiconductor-Integrated Circuit) or SiGe-HBT (Heterojunction Bipolar Transistor)-IC. Those ICs are advantageous in their mass-productivity, high uniformity and high integration though having a low voltage amplitude. On the other hand, the existing III-V compound semiconductor based drive circuit using GaAs, InP or the like is less advantageous in mass-productivity and high integration due to a high drive voltage though being capable of high speed operation. Thus, by configuring the IC drive circuit 26 as CMOS-IC or SiGe-HBT-IC, it is possible to achieve smaller size, lower cost and lower power consumption compared with the existing drive circuit.

The IC drive circuit 26 has terminals 261 and 262. The terminal 161 and the phase controller PC are connected through the terminal 261. The terminal 162 and the ground terminal of the terminator R are connected through the terminal 262. A voltage can be thereby applied between the electrodes above and below the core layer (not shown).

The phase controller PC outputs the data signal 5 to the corresponding waveguide phase modulation region WGPM in synchronization with the split clock signal 6. The phase controller PC has functions of delay control, amplitude adjustment, bias adjustment and waveform shaping, and it can control those functions using an external electric signal (not shown). Those functions can be implemented by combining an interpolator circuit (PI) and a D-flip-flop circuit (DFF) circuit, for example.

Further, a terminator R is connected between the terminal 261 and the terminal 262. The terminator R suppresses waveform distortion and bandwidth degradation due to reflection of signal output. Note that the impedance of the terminator R is matched with the output impedance of the phase controller PC connected.

According to this structure, it is possible to let the electrodes on the waveguide phase modulation regions WGPM which have been divided and decreased in capacitance operate as lumped electrodes. Further, it is possible to supply signals with different delays to the respective electrodes on the waveguide phase modulation regions. It is thus possible to easily achieve highly flexible electrical wiring, which has been impossible with normal traveling-wave electrodes.

Seventh Embodiment

Figure 9:
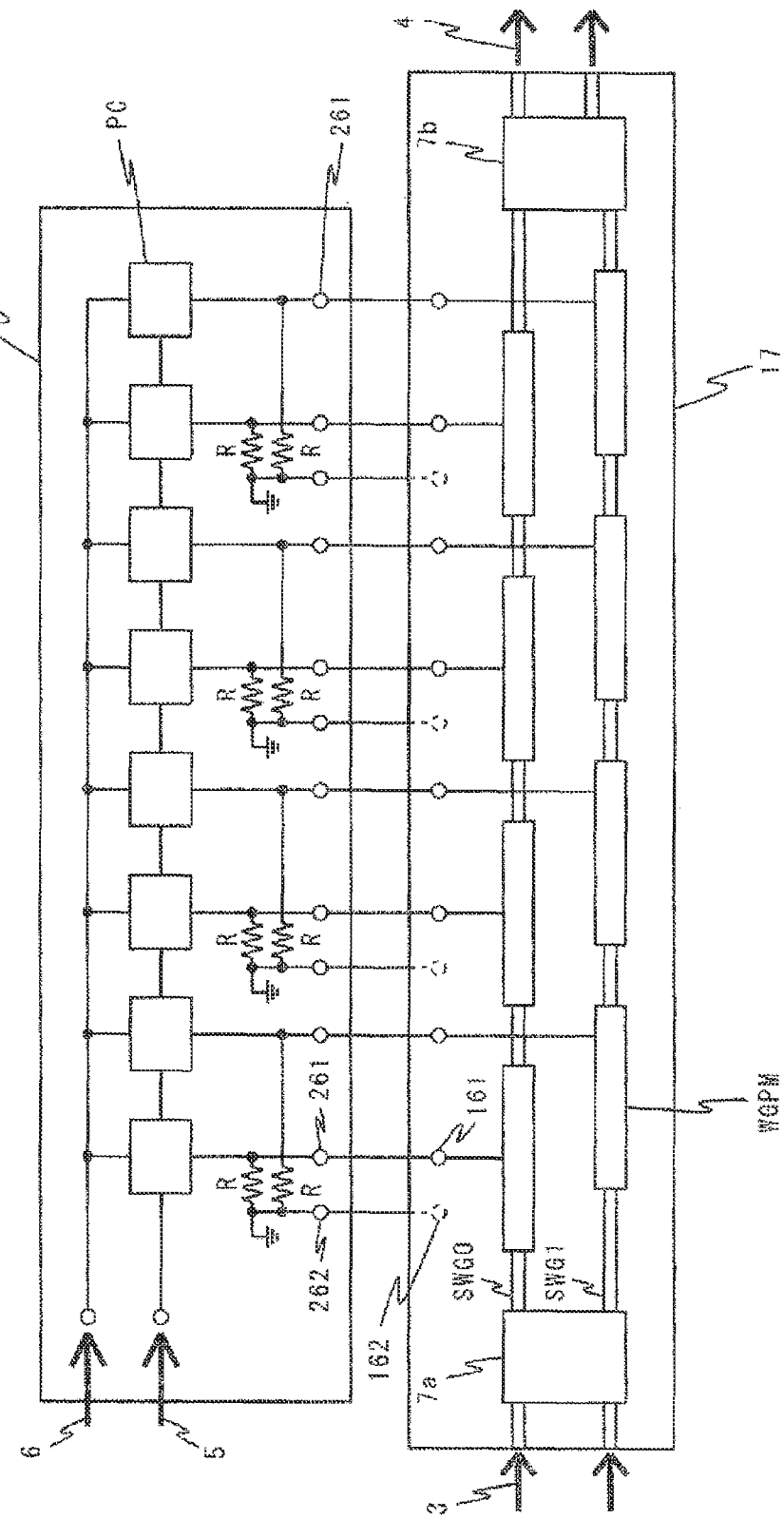
FIG. 9 is a block diagram showing a structure example of an optical signal control device 700 according to a seventh embodiment.

An optical signal control device 700 according to a seventh embodiment of the present invention is described hereinafter with reference to a specific structure example. FIG. 9 is a block diagram showing a structure example of the optical signal control device 700 according to the seventh embodiment. The optical signal control device 700 is an alternative example of the optical signal control device 600 according to the sixth embodiment. The optical signal control device 700 includes a MZ modulator 17 and an IC drive circuit 27. The MZ modulator 17 corresponds to the MZ modulator 16 of the optical signal control device 600. The IC drive circuit 27 corresponds to the IC drive circuit 26 of the optical signal control device 600.

In the MZ modulator 17, the terminal 162 that is connected below the core layer of the waveguide phase modulation region WGPM is shared by the adjacent semiconductor optical waveguides SWG0 and SWG1. The number of terminals 162 of the MZ modulator 17 is thus reduced by half compared with the MZ modulator 16.

In the IC drive circuit 27, the terminator R that is connected to the two adjacent phase controllers PC shares the ground connection. The number of terminals 262 of the IC drive circuit 27 is thus reduced by half compared with the IC drive circuit 26.

Note that, in the IC drive circuit 26, the electrodes formed above and below the core layer on the MZ modulator 16 side form a coplanar line in a ground-signal-ground configuration, which is common as a high frequency circuit. Therefore, in the optical signal control device 600, two terminals 161 and two terminals 262 are provided for the two adjacent phase controllers PC.

Thus, in the optical signal control device 700, the number of terminals can be reduced compared with the optical signal control device 600. The number of electrode pads (terminals) and wire bonding portions can be thereby reduced, thus allowing a decrease in area. Note that, specifically, in the optical signal control device 700, the number of electrode pads can be reduced to three-fourths that of the optical signal control device 600.

Further, in the case of driving the MZ modulator 17 in a differential manner, this structure is advantageous because it is preferred that signal lines are adjacent.

Eighth Embodiment

An optical matrix switch 800 according to an eighth embodiment of the present invention is described hereinafter with reference to a specific structure example. FIG. 10 is a block diagram showing a structure example of the optical matrix switch 800 according to the eighth embodiment. The optical matrix switch 800 is an alternative example of the optical signal control device 500 according to the fifth embodiment. The optical matrix switch 800 has the structure in which the optical signal control unit 15 of the optical signal control device 500 is replaced with an optical switch unit 18. The optical matrix switch 800 includes the optical switch unit 18 and a drive circuit 25. The optical switch unit 18 corresponds to the optical signal control unit 15 of the optical signal control device 500. The other structure of the optical matrix switch 800 is the same as that of the optical signal control device 500 and not redundantly described.

The optical switch unit 18 has the structure in which the l (l is an integer satisfying l≥2) number of MZ modulators 114 are included in place of the interaction regions IR and the optical splitters/combiners 7a and 7b of the optical signal control unit 15. In the optical switch unit 18, the l (l is an integer satisfying l≥2) number of MZ modulators 114 are optically connected with each other through the optical waveguide WG and the intersection of the optical waveguides WG. The MZ modulator 114 may have a common structure or may be the MZ modulator 16 or 17 described in the sixth or seventh embodiment, and not particularly limited. The drive circuit 25 is connected with the interaction region inside each of the MZ modulators, changes the phase or amplitude of the input carrier light 3 and multiplexes the light, thereby turning on and off the amplitude of light in each path. Accordingly, each of the MZ modulators 114 serves as one optical switch.

Thus, in the optical switch unit 18, optical switches, which are the MZ modulators, are combined in series and in parallel. The optical switch unit 18 thereby functions as an optical matrix switch. For example, the optical switch unit 18 can be constructed as an 8×8 (8 input 8 output) optical matrix switch by connecting 128 MZ modulators.

In the existing optical matrix switch, on/off operation has been performed by changing the phase of the input carrier light using a thin film heater. However, because this method uses heat, high-speed operation is not possible. Further, wiring is complex, and even if a high-speed signal is input, a difference of time when its electrical signal and light arrive at the interaction region varies depending on the position. Further, in the case of a large-scale optical signal control device such as the optical matrix switch 800, the existing methods that make control of a delay time with a wire length and make control by providing respective delay circuits are substantially infeasible.

On the other hand, according to this structure, it is possible to easily achieve the large-scale optical matrix switch capable of high-speed operation by driving the MZ modulators combined in series and in parallel.

Ninth Embodiment

A ninth embodiment of the present invention is described hereinafter with reference to a specific structure example. FIG. 11A is a top view showing a wiring structure of an optical signal control device 900 according to the ninth embodiment. The optical signal control device 900 is a specific example of the optical signal control device 300 according to the third embodiment.

In the third embodiment, a manufacturing method of the optical signal control device 300 is not particularly limited. Therefore, in the structure that includes a plurality of optical waveguides WG0 to WG(m−1) arranged in parallel as in the optical signal control device 300, wires connecting the interaction regions IR and the drive circuit 23 run over the other optical waveguides. In this case, the interaction electrodes IM formed on the interaction regions IR are short-circuited. To avoid this, the interaction regions IR and the interaction electrodes IM on the interaction regions IR are generally formed to be short. Alternatively, the interaction regions IR or the interaction electrodes IM on the interaction regions IR are arranged in an offset manner. Measures are thereby taken to avoid contact between the interaction electrodes IM on different interaction regions IR. However, in these techniques, a part that cannot be used as the interaction region IR increases as the number of parallels of optical waveguides increases. As a result, the interaction efficiency between light and electricity is degraded.

The optical signal control device 900 according to this embodiment has a structure for preventing the degradation of the interaction efficiency without shortening the interaction regions. The optical signal control device 900 is described hereinbelow. As shown in FIG. 11A, the optical signal control device 900 has the structure in which the number of parallels of optical waveguides is 4 (i.e. m=4) and the number of interaction regions for each optical waveguide is 2 (i.e. n=2) in the optical signal control device 300. An optical signal control unit 19 corresponds to the optical signal control unit 13 of the optical signal control device 300. A drive circuit 29 corresponds to the drive circuit 23 of the optical signal control device 300. An interaction electrode IM is an electrode that is formed on the interaction region IR of the optical signal control device 300.

In the optical signal control unit 19, an electrical wire connecting the interaction electrode IM and the electrode pad EP runs across the other interaction electrodes IM. Therefore, measures to avoid short-circuit between electrodes on the interaction electrodes IM are taken. Further, an electrode E29 of the drive circuit 29 and the electrode pad EP are connected by an electrical wire. Note that the connection point between the interaction electrode IM and the above-described electrical wire is not particularly limited. Thus, the above-described electrical wire may be connected to any position of the interaction electrodes IM as long as the interaction electrodes IM can function as a lumped electrode. Further, although the interaction electrodes IM and the electrode pad EP are connected by a linear electrical wire in FIG. 11A, it is just an example, and the shape and path of the electrical wire are not limited thereto. Thus, an electrical wire with a path different from a linear electrical wire may be used as long as the electrical propagation delay amount corresponding to the path length is adjustable. Further, the drive circuit 29 is the same as that of the first to third embodiments and not described in detail, and only the electrode E29 is shown.

Figure 11B:
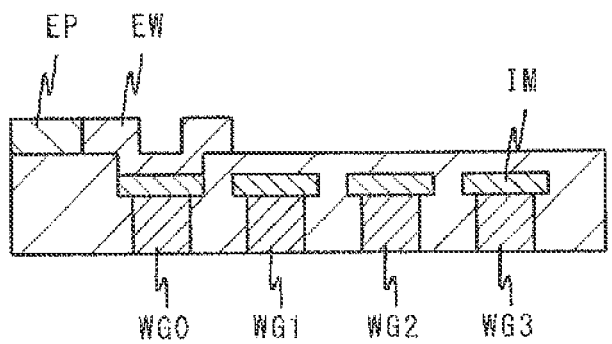
FIG. 11B is a cross-sectional view showing a wiring structure along line XIB-XIB in FIG. 11A.
Figure 11C:
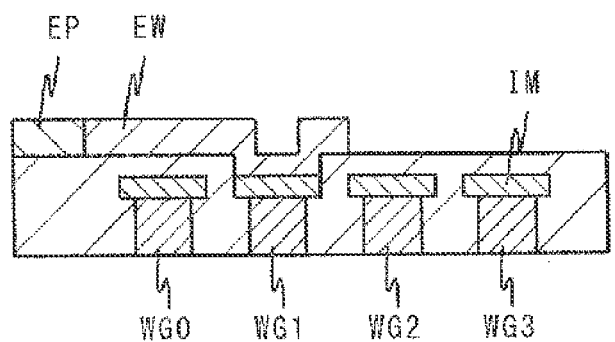
FIG. 11C is a cross-sectional view showing a wiring structure along line XIC-XIC in FIG. 11A.
Figure 11D:
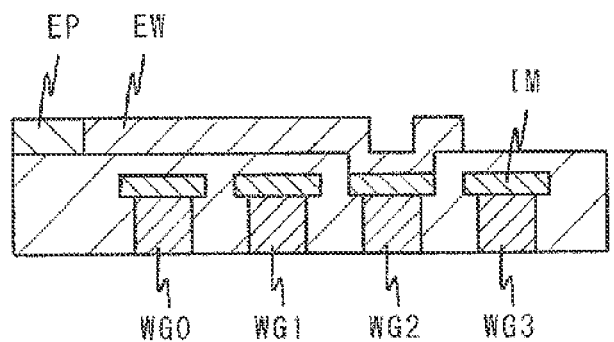
FIG. 11D is a cross-sectional view showing a wiring structure along line XID-XID in FIG. 11A.
Figure 11E:
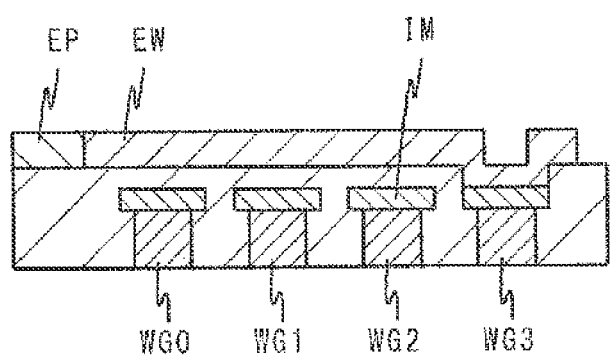
FIG. 11E is a cross-sectional view showing a wiring structure along line XIE-XIE in FIG. 11A.

FIGS. 11B to 11E are cross-sectional views showing a wiring structure along lines XIB-XIB, XIC-XIC, XID-XID and XIE-XIE in FIG. 11A. The optical signal control device 900 has a feature that the interaction electrode IM and an electrical wire EW of a lead part are formed in different layers (multilayer wiring). The electrode pad EP is electrically connected to only the corresponding interaction electrode IM through the electrical wire EW of the lead part.

An example of a manufacturing method of the above-described multilayer wiring is described. First, optical waveguides WG including interaction regions are formed on a semiconductor substrate, for example. After that, the interaction electrodes IM are formed in the upper layer of the optical waveguides WG. Next, insulating resin such as photosensitive PBO (polybenzoxazole), for example, is applied thereto. Then, only the photosensitive PBO on the interaction electrodes IM connected to the electrode pads EP are removed by exposure. After that, the electrical wires EW are formed, thereby producing the cross-sectional structure shown in FIG. 11B. Note that, however, this manufacturing method is just by way of illustration and does not limit the manufacturing method of the multilayer wiring.

According to this structure, it is possible to increase the number of parallels of optical waveguides without decreasing the length of interaction regions, in addition to achieving the same advantages as in the first embodiment. Further, because a simple and general-purpose structure can be implemented, each of the interaction regions can be arranged with the same length with a certain electrical isolation region interposed therebetween, for example. The optical phase modulator region, however, may have a different length.

Tenth Embodiment

An optical signal control device 1000 according to a tenth embodiment of the present invention is described hereinafter with reference to a specific structure example. FIG. 12 is a block diagram showing a structure example of the optical signal control device 1000 according to the tenth embodiment. The optical signal control device 1000 has the structure in which the MZ modulator 16 of the optical signal control device 600 according to the sixth embodiment is replaced with a MZ modulator 110. The MZ modulator 110 has the structure in which the terminal 162 of the MZ modulator 16 is replaced with a terminal 1001.

The terminal 1001 is used for connection between the MZ modulator 110 and the IC drive circuit 26. The terminal 1001 is electrically connected to an electrode formed above the MZ modulator 110. The terminal 1001 and the ground terminal of the terminator R are connected through the terminal 262. A voltage can be thereby applied between the terminal 161 and the terminal 1001. The other structure of the optical signal control device 1000 is the same as that of the optical signal control device 600 and thus not redundantly described. Note that, however, although the placement of the terminators R is just an example and not limit the layout, it is preferred that the terminators R are placed near the waveguide phase modulation regions WGPM in terms of high frequency characteristics.

According to this structure, it is possible to let the electrodes on the waveguide phase modulation regions WGPM which have been divided and decreased in capacitance operate as lumped electrodes. Further, it is possible to supply signals with different delays to the respective electrodes on the waveguide phase modulation regions. It is thus possible to easily achieve highly flexible electrical wiring, which has been impossible with normal traveling-wave electrodes, just like the optical signal control device 600.

Eleventh Embodiment

Figure 13:
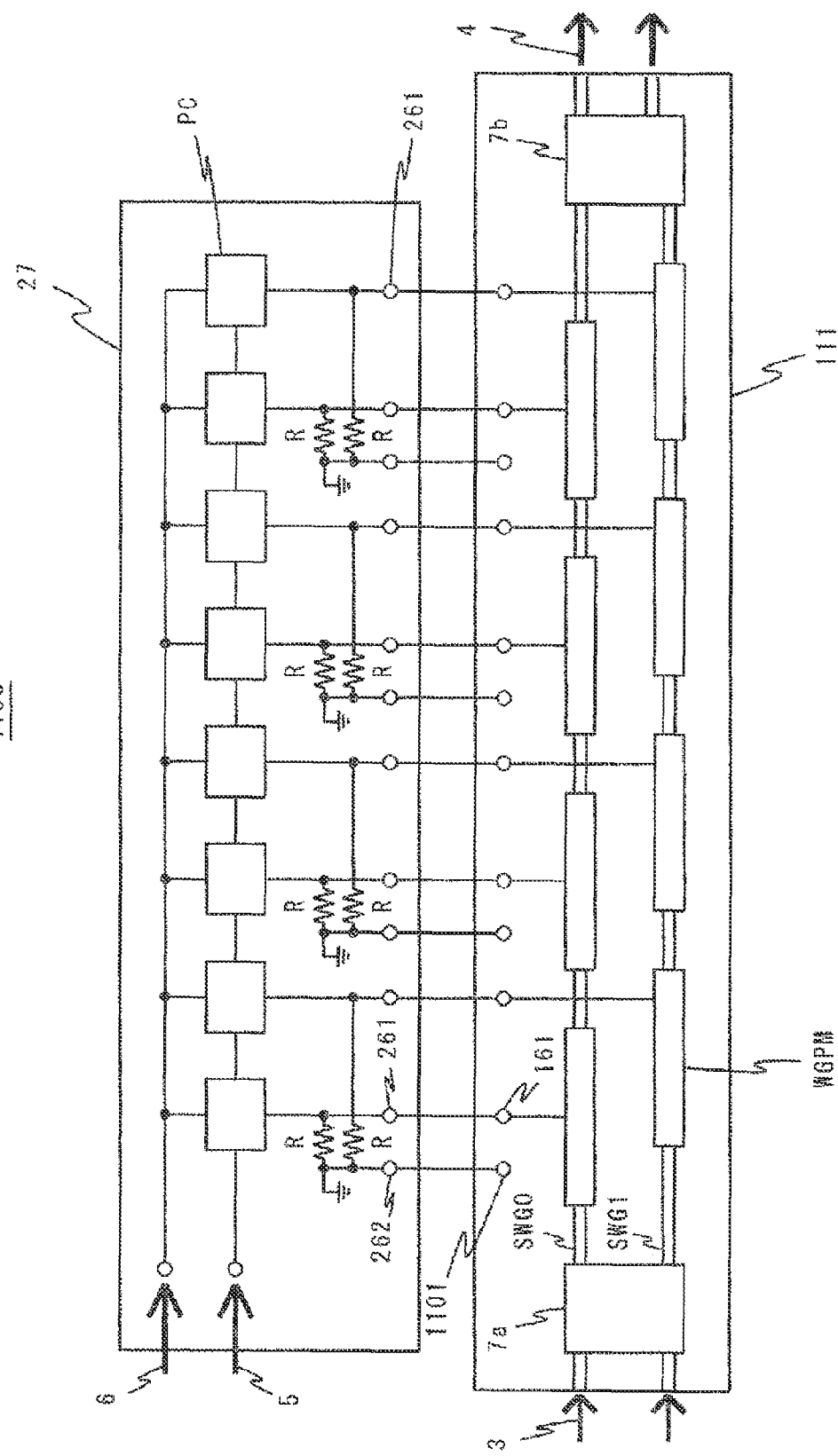
FIG. 13 is a block diagram showing a structure example of an optical signal control device 1100 according to an eleventh embodiment.

An optical signal control device 1100 according to an eleventh embodiment of the present invention is described hereinafter with reference to a specific structure example. FIG. 13 is a block diagram showing a structure example of the optical signal control device 1100 according to the eleventh embodiment. The optical signal control device 1100 has the structure in which the MZ modulator 17 of the optical signal control device 700 according to the seventh embodiment is replaced with a MZ modulator 111. The MZ modulator 111 has the structure in which the terminal 162 of the MZ modulator 17 is replaced with a terminal 1101.

The terminal 1101 is used for connection between the MZ modulator 111 and the IC drive circuit 27. The terminal 1101 is electrically connected to an electrode formed above the MZ modulator 111. The terminal 1101 and the ground terminal of the terminator R are connected through the terminal 262. A voltage can be thereby applied between the terminal 161 and the terminal 1101. The other structure of the optical signal control device 1100 is the same as that of the optical signal control device 700 and thus not redundantly described. Note that, however, although the placement of the terminators R is just an example and not limit the layout, it is preferred that the terminators R are placed near the waveguide phase modulation regions WGPM in terms of high frequency characteristics.

Thus, in the optical signal control device 1100, the number of terminals can be reduced compared with the optical signal control devices 600 and 1000. The number of electrode pads (terminals) and wire bonding portions can be thereby reduced, thus allowing a decrease in area. Note that, specifically, in the optical signal control device 1100, the number of electrode pads can be reduced to three-fourths that of the optical signal control devices 600 and 1000.

Twelfth Embodiment

Figure 14:
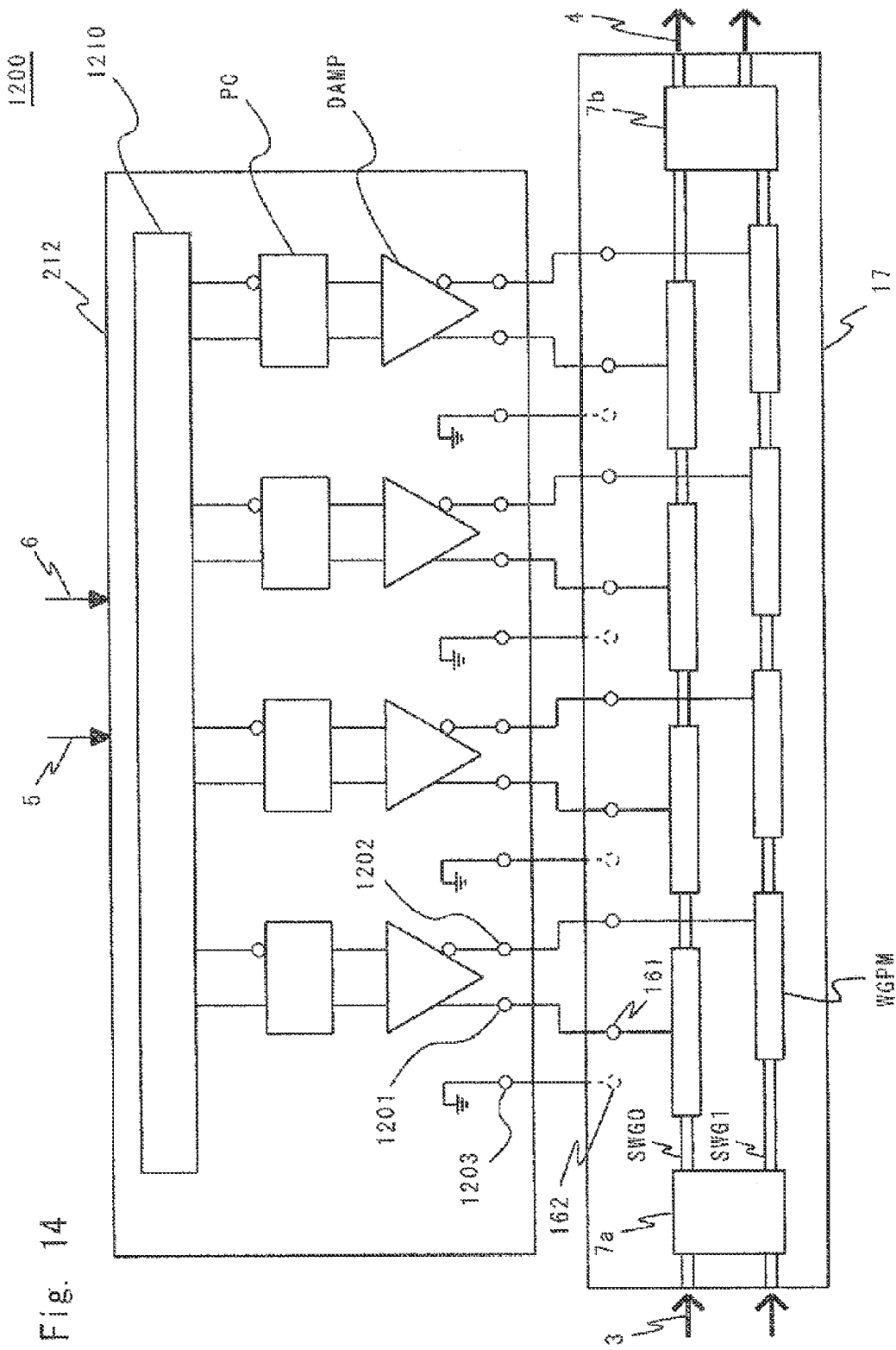
FIG. 14 is a block diagram showing a structure example of an optical signal control device 1200 according to a twelfth embodiment.

An optical signal control device 1200 according to a twelfth embodiment of the present invention is described hereinafter with reference to a specific structure example. FIG. 14 is a block diagram showing a structure example of the optical signal control device 1200 according to the twelfth embodiment. The optical signal control device 1200 is an alternative example of the optical signal control device 700 according to the seventh embodiment. The optical signal control device 1200 includes a MZ modulator 17 and an IC drive circuit 212. The IC drive circuit 212 corresponds to the IC drive circuit 27 of the optical signal control device 700. The IC drive circuit 212 includes a signal generator 1210, phase controllers PC and a differential driver amplifier DAMP.

The signal generator 1210 generates the data signal S that drives the interaction regions IR from the at least 1-bit data signal 5 that is input externally. Each of the phase controllers PC controls the phase of the data signal generated in the signal generator 1210 using the externally input clock 6 as a reference and outputs it. The data signal with the positive phase is input to one input terminal of the phase controllers PC, and the data signal with the negative phase is input to the other input terminal of the phase controllers PC. The differential driver amplifier DAMP adjusts the voltage amplitude and the offset voltage of the data signals, which serve as a pair of differential signals, output from the respective phase controllers PC and outputs them. The pair of differential signals output from the differential driver amplifier DAMP are respectively connected to the waveguide phase modulation regions WGPM at different arms of the MZ modulator 17 through the terminals 1201 and 1202. Note that, the terminal 162 of the MZ modulator 17 is preferably connected to the ground through the terminal 1203 in terms of high frequency characteristics.

In this embodiment, the phases of one pair of differential outputs are determined by one phase controller PC and thus cannot be adjusted independently. However, the waveguide phase modulation regions WGPM at both arms of the MZ modulator 17 are placed opposite to each other, so that there is no effect caused by a delay due to the propagation of light. Further, because one pair of semiconductor optical waveguides SWG can be placed close to each other, and therefore the effect of a delay due to the propagation of a drive electrical signal caused by a difference in wire length is also sufficiently small. Therefore, characteristics can be obtained by adjusting the phase between the waveguide phase modulation regions WGPM arranged in a column to coincide with the light propagation delay, not by adjusting the phase between differential outputs.

This embodiment can eliminate the effect of in-phase noise with use of a differential circuit, and it is thus advantageous in improving the signal quality in a high frequency region. Further, it is an advantageous structure because it can be applied as it is in the case of push-pull operation where both arms of the MZ modulator are driven with a differential signal.

Thirteenth Embodiment

Figure 15:
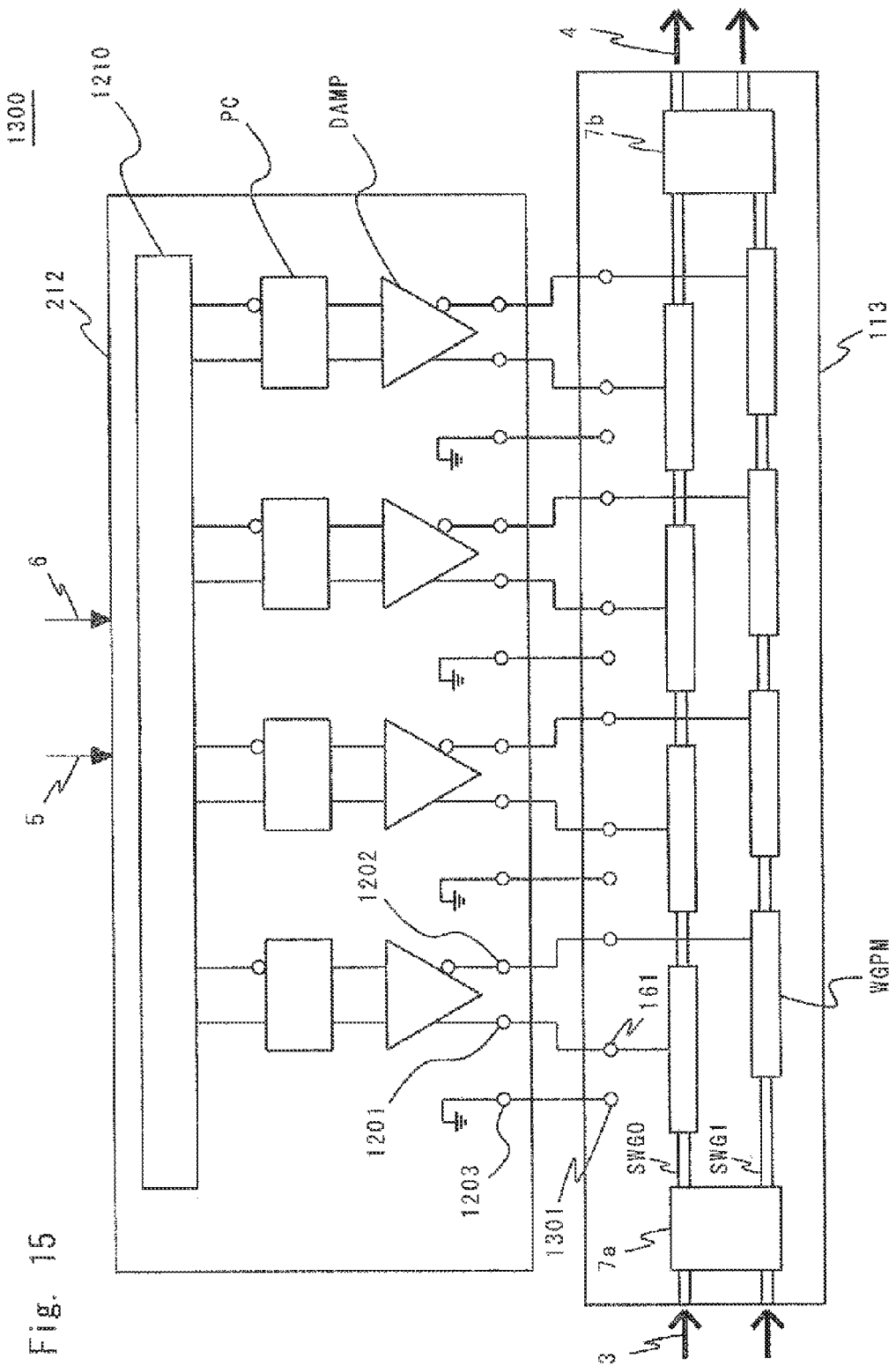
FIG. 15 is a block diagram showing a structure example of an optical signal control device 1300 according to a thirteenth embodiment.

An optical signal control device 1300 according to a thirteenth embodiment of the present invention is described hereinafter with reference to a specific structure example. FIG. 15 is a block diagram showing a structure example of the optical signal control device 1300 according to the thirteenth embodiment. The optical signal control device 1300 is an alternative example of the optical signal control device 1200 according to the twelfth embodiment. The optical signal control device 1300 has the structure in which the MZ modulator 17 of the optical signal control device 1200 is replaced with a MZ modulator 113. The MZ modulator 113 has the structure in which the terminal 162 of the MZ modulator 17 is replaced with a terminal 1301.

The terminal 1301 is used for connection between the MZ modulator 113 and the IC drive circuit 212. The terminal 1301 is electrically connected to an electrode formed above the MZ modulator 113. The other structure of the optical signal control device 1300 is the same as that of the optical signal control device 1200 and thus not redundantly described.

According to this structure, it is possible to implement the optical signal control device having the same advantages as the optical signal control device 1200.

It should be noted that the present invention is not limited to these embodiments and may be varied in many ways without departing from the spirit and scope of the present invention. For example, the semiconductor optical waveguides according to the sixth and seventh embodiments can be formed using a material other than semiconductor. For example, the optical waveguides may be formed using another material having the electro-optical effect, such as LiNbO3 (which is referred to hereinafter as LN) or polymer.

Further, the optical signal control device according to the first to fifth embodiments and the optical signal control device according to the sixth and seventh embodiments may be applied also to other optical devices such as an optical switch, photodetector, semiconductor light emitting device, LN optical device and organic optical device.

The terminals 161, 162, 261 and 262 according to the seventh and eighth embodiments are not limited to the above examples. For example, the structure in which the terminal 161 and the terminal 262 are connected, and the terminal 162 and the terminal 261 are connected may be employed.

Further, although in the optical signal control device according to the first to seventh embodiments and the optical matrix switch according to the eighth embodiment, the drive circuit or the IC drive circuit (which are referred to hereinafter as a drive unit) and the optical signal control unit, the MZ modulator or the optical switch unit (hereinafter as a control unit) are placed on the same lane and signals are transmitted, it is not practically limited thereto. For example, the drive unit and the control unit may be flip-chip mounted on top of one another, or may be mounted using an interposer substrate or the like for three-dimensional layout.

Further, the structure of the drive circuit 21 of the optical signal control device 100 according to the first embodiment is not limited to the above example. Although only the phase controllers PC and the terminators R are shown in FIG. 1 as the elements of the drive circuit 21, this is because the illustration of the elements known to those skilled in the art is omitted. The structure of the drive circuit 21 is described in further detail hereinbelow. FIG. 16 is a block diagram showing the structure of the drive circuit 21. The drive circuit 21 includes a signal generator 2101, the n-number of phase controllers PC and the n-number of drive amplifiers AMP.

The signal generator 2101 generates the data signal S that drives the interaction regions IR from the at least 1-bit data signal 5 that is input externally. Each of the n number of phase controllers PC controls the phase of the data signal generated in the signal generator 2101 using the externally input clock 6 as a reference and outputs it. The n-number of drive amplifiers AMP adjust the voltage amplitude and the offset voltage of the data signals output from each of the n number of phase controllers PC and output them as the data signals S0 to S(n−1).

Note that the placement of the terminators R shown in FIG. 1 is just an example and the terminators R are preferably placed near the interaction regions IR. Specifically, the terminator R is not an essential element for the drive circuit 21. Thus, the terminators R are not shown in FIG. 16. However, because the terminator R is an essential element for the operation of the optical signal control devices according to the above-described embodiments, the terminators are preferably added separately to the inside of the drive circuit 21, the inside of the optical signal control unit 11, or the outside of the drive circuit 21 and the optical signal control unit 11, and may be placed in appropriate positions in consideration of the element size or the mounting state.

Further, in the second to eleventh embodiments also, the drive circuit and the IC drive circuit may be configured using the signal generator, the phase controllers PC and the driver amplifier AMP just like the drive circuit shown in FIG. 16.

The whole or part of the embodiments disclosed above can be described as, but not limited to, the following supplementary notes.

(Supplementary Note 1)
An optical signal control device comprising:
an optical signal control unit for outputting output light generated by changing an amplitude and a phase of input carrier light; and
a drive circuit for supplying a data signal for controlling a change in the amplitude and the phase of the carrier light to the optical signal control unit, wherein
the optical signal control unit includes:
m (m is an integer of one or more) number of optical waveguides arranged in parallel between light input and light output, for letting the carrier light propagate therethrough; and
(m×n) number of interaction regions, n (n is an integer of one or more) number of interaction regions formed on each of the m number of optical waveguides, for changing the amplitude and the phase of the carrier light propagating through each of the m number of optical waveguides in accordance with the data signal,
the drive circuit includes:
(m×n) number of phase control units for receiving the data signal from outside, controlling the phase of the received data signal and outputting the data signal to each of the (m×n) number of interaction regions,
each of the (m×n) number of phase control units outputs the data signal so that timing when the carrier light propagating through the optical signal control unit arrives at the interaction region to output the data signal and timing when the data signal arrives at the interaction region are synchronized, and one of m and n is two or more.

(Supplementary Note 2)
The optical signal control device according to Supplementary note 1, wherein
the (m×n) number of phase control units output the data signal at different timing from one another.

(Supplementary Note 3)
The optical signal control device according to Supplementary note 1 or 2, wherein
each of the (m×n) number of phase control units outputs the data signal at later timing as the interaction region to output the data signal is farther from a light input end of the optical signal control unit.

(Supplementary Note 4)
The optical signal control device according to any one of Supplementary notes 1 to 3, wherein
each of the (m×n) number of phase control units outputs the data signal at later timing as the interaction region to output the data signal is closer to the drive circuit.

(Supplementary Note 5)
The optical signal control device according to any one of Supplementary notes 1 to 4, wherein
the optical signal control unit includes:
a first optical splitter/combiner placed on a light input end of any two optical waveguides among the m number of optical waveguides; and
a second optical splitter/combiner placed on a light output end of the two optical waveguides, and
the two optical waveguides, the first optical splitter/combiner and the second optical splitter/combiner form one set of Mach-Zehnder interferometer.

(Supplementary Note 6)
The optical signal control device according to any one of Supplementary notes 1 to 5, wherein
the optical signal control unit further includes:
a first electrode formed above a core layer of a first interaction region among the (m×n) number of interaction regions;
a second electrode formed below the core layer of the first interaction region;
a first terminal connected to the first electrode; and
a second terminal connected to the second electrode, and
the data signal is input to one of the first terminal and the second terminal, and another one is connected to a ground.

(Supplementary Note 7)
The optical signal control device according to Supplementary note 6, wherein
the first electrode and the first terminal are connected by an electrical wire, and
the first interaction region, the first electrode and the electrical wire are formed in different layers or on electrically isolated regions between adjacent first electrodes, so that the electrical wire and the interaction regions different from the first interaction region are electrically isolated.

(Supplementary Note 8)
The optical signal control device according to Supplementary note 6 or 7, wherein
the first electrode and the second electrode formed on each of the (m×n) number of interaction regions are lumped electrodes.

(Supplementary Note 9)
The optical signal control device according to any one of Supplementary notes 6 to 8, wherein
the drive circuit further includes:
a third terminal connected to a first phase control unit among the (m×n) number of phase control units and the first terminal;
a fourth terminal connected to the first phase control unit and the second terminal; and
a first terminator with one end connected to the first phase control unit and another end connected to the fourth terminal and a ground.

(Supplementary Note 10)
The optical signal control device according to any one of Supplementary notes 6 to 8, wherein
the drive circuit further includes:
a third terminal connected to a first phase control unit among the (m×n) number of phase control units and the second terminal;
a fourth terminal connected to the first phase control unit and the first terminal; and
a first terminator with one end connected to the first phase control unit and another end connected to the fourth terminal and a ground.

(Supplementary Note 11)
The optical signal control device according to Supplementary note 9 or 10, wherein
the optical signal control device includes:
a third electrode formed above a core layer of a second interaction region different from the first interaction region;
a fourth electrode formed below the core layer of the second interaction region and connected to the second terminal; and
a fifth terminal connected to the third electrode, and the drive circuit further includes:
a sixth terminal connected to a second phase control unit different from the first phase control unit and the fifth terminal; and
a second terminator with one end connected to the fourth terminal and another end connected to the sixth terminal.

(Supplementary Note 12)

The optical signal control device according to Supplementary note 11, wherein the third electrode and the fourth electrode are lumped electrodes being the same as the first electrode and the second electrode.

(Supplementary Note 13)

The optical signal control device according to any one of Supplementary notes 1 to 12, wherein the optical signal control unit includes l (l is an integer of two or more) number of optical splitters/combiners, and each of the l number of optical splitters/combiners is placed between the interaction regions formed on any two optical waveguides among the m number of optical waveguides.

(Supplementary Note 14)

An optical signal control method comprising:

inputting carrier light to m (m is an integer of one or more) number of optical waveguides;

receiving a data signal for controlling a change in an amplitude and a phase of the carrier light by (m×n) number of phase control units and controlling the phase of the received data signal;

outputting the data signal with the controlled phase from the (m×n) number of phase control units to (m×n) number of interaction regions, n (n is an integer of one or more) number of interaction regions formed on each of the m number of optical waveguides, so that the data signal with the controlled phase arrives at the interaction region in synchronization with timing when the carrier light arrives at each of the (m×n) number of interaction regions;

outputting the carrier light with the amplitude and the phase changed by the (m×n) number of interaction regions as output light, and one of m and n is two or more.

(Supplementary Note 15)

An optical matrix switch comprising:

an optical switch unit for changing an amplitude and a phase of input carrier light and outputting output light; and a drive circuit for supplying a data signal for controlling operation of the optical signal control unit, wherein the optical switch unit includes:

m (m is an integer of one or more) number of optical waveguides arranged in parallel between light input and light output, for letting the carrier light propagate therethrough;

(m×n) number of interaction regions, n (n is an integer of one or more) number of interaction regions formed on each of the m number of optical waveguides; and l (l is an integer of two or more) number of optical splitters/combiners, the drive circuit includes:

(m×n) number of phase control units for receiving the data signal for controlling an action of the (m×n) number of interaction regions and outputting the received data signal to each of the (m×n) number of interaction regions, each of the (m×n) number of phase control units outputs the data signal so that timing when the carrier light propagates to the interaction region to output the data signal and timing when the data signal arrives at the interaction region are synchronized, one of m and n is two or more, and each of the l number of optical splitters/combiners is placed between the interaction regions formed on any two optical waveguides among the m number of optical waveguides.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-271757, filed on Dec. 6, 2010, the disclosure of which is incorporated herein in its entirety by reference.

INDUSTRIAL APPLICABILITY

The present invention may be applied to a digital control optical circuit, and an optical modulator, an optical switch, a photodetector and the like using the digital control optical circuit, for example. Further, the digital control optical circuit may be applied to a semiconductor light emitting device, a LN optical device, an organic optical device and the like, for example.

REFERENCE SIGNS LIST

3 CARRIER LIGHT
4 OUTPUT LIGHT
5 DATA SIGNAL
6 CLOCK SIGNAL
7A, 7B, 8 OPTICAL SPLITTER/COMBINER
11 TO 15, 19 OPTICAL SIGNAL CONTROL UNIT
16, 17, 110, 111, 113, 114 MZ MODULATOR
18 OPTICAL SWITCH UNIT
21~25, 29 DRIVE CIRCUIT
26, 27, 212 IC DRIVE CIRCUIT
100, 200, 300, 400, 500, 600, 700, 900, 1000, 1100, 1200, 1300 OPTICAL SIGNAL CONTROL UNIT
800 OPTICAL MATRIX SWITCH
161, 162, 261, 262, 1001, 1101, 1201-1203, 1301 TERMINAL
1210, 2101 SIGNAL GENERATOR
AMP DRIVER AMPLIFIER
DAMP DIFFERENTIAL DRIVER AMPLIFIER
E24, E29 ELECTRODE
EP ELECTRODE PAD
EW ELECTRICAL WIRE
IM INTERACTION ELECTRODE
IR INTERACTION REGION
PC PHASE CONTROLLER
WGPM WAVEGUIDE PHASE MODULATION REGION
R TERMINATOR
S DATA SIGNAL
SWG0, 62 SEMICONDUCTOR OPTICAL WAVEGUIDE
WG OPTICAL WAVEGUIDE

The invention claimed is:

1. An optical signal control device comprising:
an optical signal control unit that outputs output light generated by changing an amplitude and a phase of input carrier light; and
a drive circuit that supplies a data signal for controlling a change in the amplitude and the phase of the carrier light to the optical signal control unit, wherein
the optical signal control unit includes:
m (m is an integer of one or more) number of optical waveguides arranged in parallel between light input and light output, for letting the carrier light propagate therethrough; and (m×n) number of interaction regions, n (n is an integer of one or more) number of interaction regions formed on each of the m number of optical waveguides, for changing the amplitude and the phase of the carrier light propagating through each of the m number of optical waveguides in accordance with the data signal, the drive circuit includes:
(m×n) number of phase control units that receive the data signal from outside, control the phase of the received data signal and output the data signal to each of the (m×n) number of interaction regions, each of the (m×n) number of phase control units outputs the data signal so that timing when the carrier light propagating through the optical signal control unit arrives at the interaction region to output the data signal and timing when the data signal arrives at the interaction region are synchronized, and one of m and n is two or more, wherein each of the (m×n) number of phase control units outputs the data signal at later timing as the interaction region to output the data signal is closer to the drive circuit.

2. The optical signal control device according to claim 1, wherein
the (m×n) number of phase control unit output the data signal at different timing from one another.

3. The optical signal control device according to claim 1, wherein
each of the (m×n) number of phase control units outputs the data signal at later timing as the interaction region to output the data signal is farther from a light input end of the optical signal control unit.

4. The optical signal control device according to claim 1, wherein
the optical signal control unit further includes:
a first optical splitter/combiner placed on a light input end of any two optical waveguides among the m number of optical waveguides; and
a second optical splitter/combiner placed on a light output end of the two optical waveguides, and
the two optical waveguides, the first optical splitter/combiner and the second optical splitter/combiner form one set of Mach-Zehnder interferometer.

5. An optical signal control device comprising:
an optical signal control unit that outputs output light generated by changing an amplitude and a phase of input carrier light; and
a drive circuit that supplies a data signal for controlling a change in the amplitude and the phase of the carrier light to the optical signal control unit, wherein
the optical signal control unit includes:
m (m is an integer of one or more) number of optical waveguides arranged in parallel between light input and light output, for letting the carrier light propagate therethrough; and
(m×n) number of interaction regions, n (n is an integer of one or more) number of interaction regions formed on each of the m number of optical waveguides, for changing the amplitude and the phase of the carrier light propagating through each of the m number of optical waveguides in accordance with the data signal,
the drive circuit includes:
(m×n) number of phase control units that receive the data signal from outside, control the phase of the received data signal and output the data signal to each of the (m×n) number of interaction regions, each of the (m×n) number of phase control units outputs the data signal so that timing when the carrier light propagating through the optical signal control unit arrives at the interaction region to output the data signal and timing when the data signal arrives at the interaction region are synchronized, and one of m and n is two or more, wherein
the optical signal control unit further includes:
a first electrode formed above a core layer of a first interaction region among the (m×n) number of interaction regions;
a second electrode formed below the core layer of the first interaction region;
a first terminal connected to the first electrode; and
a second terminal connected to the second electrode, and
the data signal is input to one of the first terminal and the second terminal, and another one is connected to a ground.

6. The optical signal control device according to claim 5, wherein
the first electrode and the first terminal are connected by an electrical wire, and
the first interaction region, the first electrode and the electrical wire are formed in different layers or on electrically isolated regions between adjacent first electrodes, so that the electrical wire and the interaction regions different from the first interaction region are electrically isolated.

7. The optical signal control device according to claim 5, wherein
the first electrode and the second electrode formed on each of the (m×n) number of interaction regions are lumped electrodes.

8. The optical signal control device according to claim 5, wherein
the drive circuit further includes:
a third terminal connected to a first phase control unit among the (m×n) number of phase control units and the first terminal;
a fourth terminal connected to the second terminal on a path connecting the first phase control unit and the second terminal; and
a first terminator with one end connected to the first phase control unit and another end connected to the fourth terminal and a ground.

9. An optical signal control method comprising:
inputting carrier light to m (m is an integer of one or more) number of optical waveguides;
receiving a data signal for controlling a change in an amplitude and a phase of the carrier light by (m×n) number of phase control units and controlling the phase of the received data signal;
outputting the data signal with the controlled phase from the (m×n) number of phase control units to (m×n) number of interaction regions, n (n is an integer of one or more) number of interaction regions formed on each of the m number of optical waveguides, so that the data signal with the controlled phase arrives at the interaction region in synchronization with timing when the carrier light arrives at each of the (m×n) number of interaction regions; and
outputting the carrier light with the amplitude and the phase changed by the (m×n) number of interaction regions as output light, wherein one of m and n is two or more, wherein each of the (m×n) number of phase control units outputs the data signal at later timing as the interaction region to output the data signal is closer to a drive circuit in which the (m×n) number of phase control units are provided.

10. The optical signal control device according to claim 5, wherein the drive circuit further includes:
a third terminal connected to a first phase control unit among the (m×n) number of phase control units and the second terminal;
a fourth terminal connected to the first phase control unit and the first terminal; and
a first terminator with one end connected to the first phase control unit and another end connected to the fourth terminal and a ground.

11. The optical signal control device according to claim 8, wherein the optical signal control unit includes:
a third electrode formed above a core layer of a second interaction region different from the first interaction region;
a fourth electrode formed below the core layer of the second interaction region and connected to the second terminal; and
a fifth terminal connected to the third electrode, and
the drive circuit further includes:
a sixth terminal connected to a second phase control unit different from the first phase control unit and the fifth terminal; and
a second terminator with one end connected to the fourth terminal and another end connected to the sixth terminal.

12. The optical signal control device according to claim 11, wherein the third electrode and the fourth electrode are lumped electrodes being the same as the first electrode and the second electrode.

13. The optical signal control device according to claim 1, wherein the optical signal control unit includes l (l is an integer of two or more) number of optical splitters/combiners, and
each of the l number of optical splitters/combiners is placed between the interaction regions formed on any two optical waveguides among the m number of optical waveguides.

14. An optical matrix switch comprising:
an optical switch unit that changes an amplitude and a phase of input carrier light and outputs output light; and
a drive circuit that supplies a data signal for controlling operation of the optical switch unit, wherein
the optical switch unit includes:
m (m is an integer of one or more) number of optical waveguides arranged in parallel between light input and light output, for letting the carrier light propagate therethrough;
(m×n) number of interaction regions, n (n is an integer of one or more) number of interaction regions formed on each of the m number of optical waveguides; and
l (l is an integer of two or more) number of optical splitters/combiners, the drive circuit includes:
(m×n) number of phase control units that receive the data signal for controlling an action of the (m×n) number of interaction regions and output the received data signal to each of the (m×n) number of interaction regions, each of the (m×n) number of phase control units outputs the data signal so that timing when the carrier light propagates to the interaction region to output the data signal and timing when the data signal arrives at the interaction region are synchronized,
one of m and n is two or more, and
each of the l number of optical splitters/combiners is placed between the interaction regions formed on any two optical waveguides among the m number of optical waveguides,
wherein each of the (m×n) number of phase control units outputs the data signal at later timing as the interaction region to output the data signal is closer to the drive circuit.

15. An optical signal control device comprising:
an optical signal control means for outputting output light generated by changing an amplitude and a phase of input carrier light; and
a drive circuit for supplying a data signal for controlling a change in the amplitude and the phase of the carrier light to the optical signal control means, wherein
the optical signal control means includes:
m (m is an integer of one or more) number of optical waveguides arranged in parallel between light input and light output, for letting the carrier light propagate therethrough; and
(m×n) number of interaction regions, n (n is an integer of one or more) number of interaction regions formed on each of the m number of optical waveguides, for changing the amplitude and the phase of the carrier light propagating through each of the m number of optical waveguides in accordance with the data signal,
the drive circuit includes:
(m×n) number of phase control means for receiving the data signal from outside, controlling the phase of the received data signal and outputting the data signal to each of the (m×n) number of interaction regions,
each of the (m×n) number of phase control means outputs the data signal so that timing when the carrier light propagating through the optical signal control means arrives at the interaction region to output the data signal and timing when the data signal arrives at the interaction region are synchronized, and
one of m and n is two or more,
wherein each of the (m×n) number of phase control means outputs the data signal at later timing as the interaction region to output the data signal is closer to the drive circuit.

16. An optical signal control method comprising:
inputting carrier light to m (m is an integer of one or more) number of optical waveguides;
receiving a data signal for controlling a change in an amplitude and a phase of the carrier light by (m×n) number of phase control units and controlling the phase of the received data signal;
outputting the data signal with the controlled phase from the (m×n) number of phase control units to (m×n) number of interaction regions, n (n is an integer of one or more) number of interaction regions formed on each of the m number of optical waveguides, so that the data signal with the controlled phase arrives at the interaction region in synchronization with timing when the carrier light arrives at each of the (m×n) number of interaction regions; and outputting the carrier light with the amplitude and the phase changed by the (m×n) number of interaction regions as output light, wherein one of m and n is two or more, wherein a first electrode is formed above a core layer of a first interaction region among the (m×n) number of interaction regions, a second electrode is formed below the core layer of the first interaction region, a first terminal is connected to the first electrode, a second terminal is connected to the second electrode, and the data signal is input to one of the first terminal and the second terminal, and another one is connected to a ground.

17. An optical matrix switch comprising:

an optical switch unit that changes an amplitude and a phase of input carrier light and outputs output light; and a drive circuit that supplies a data signal for controlling operation of the optical switch unit, wherein the optical switch unit includes:

m (m is an integer of one or more) number of optical waveguides arranged in parallel between light input and light output, for letting the carrier light propagate therethrough;

(m×n) number of interaction regions, n (n is an integer of one or more) number of interaction regions formed on each of the m number of optical waveguides; and l (l is an integer of two or more) number of optical splitters/combiners, the drive circuit includes:

(m×n) number of phase control units that receive the data signal for controlling an action of the (m×n) number of interaction regions and output the received data signal to each of the (m×n) number of interaction regions, each of the (m×n) number of phase control units outputs the data signal so that timing when the carrier light propagates to the interaction region to output the data signal and timing when the data signal arrives at the interaction region are synchronized, one of m and n is two or more, and each of the l number of optical splitters/combiners is placed between the interaction regions formed on any two optical waveguides among the m number of optical waveguides, wherein the optical switch unit further includes:

a first electrode formed above a core layer of a first interaction region among the (m×n) number of interaction regions;

a second electrode formed below the core layer of the first interaction region;

a first terminal connected to the first electrode; and a second terminal connected to the second electrode, and the data signal is input to one of the first terminal and the second terminal, and another one is connected to a ground.

18. An optical signal control device comprising:

an optical signal control means for outputting output light generated by changing an amplitude and a phase of input carrier light; and a drive circuit for supplying a data signal for controlling a change in the amplitude and the phase of the carrier light to the optical signal control means, wherein the optical signal control means includes:

m (m is an integer of one or more) number of optical waveguides arranged in parallel between light input and light output, for letting the carrier light propagate therethrough; and (m×n) number of interaction regions, n (n is an integer of one or more) number of interaction regions formed on each of the m number of optical waveguides, for changing the amplitude and the phase of the carrier light propagating through each of the m number of optical waveguides in accordance with the data signal, the drive circuit includes:

(m×n) number of phase control means for receiving the data signal from outside, controlling the phase of the received data signal and outputting the data signal to each of the (m×n) number of interaction regions, each of the (m×n) number of phase control means outputs the data signal so that timing when the carrier light propagating through the optical signal control means arrives at the interaction region to output the data signal and timing when the data signal arrives at the interaction region are synchronized, and one of m and n is two or more, wherein the optical signal control means further includes:

a first electrode formed above a core layer of a first interaction region among the (m×n) number of interaction regions;

a second electrode formed below the core layer of the first interaction region;

a first terminal connected to the first electrode; and a second terminal connected to the second electrode, and the data signal is input to one of the first terminal and the second terminal, and another one is connected to a ground.

* * * * *